(12) United States Patent
Huang et al.

(10) Patent No.: US 12,457,025 B2
(45) Date of Patent: Oct. 28, 2025

(54) USER EQUIPMENT-ASSISTED BEAM BROADENING

(71) Applicant: QUALCOMM Incorporated, San Diego, CA (US)

(72) Inventors: Min Huang, Beijing (CN); Yu Zhang, San Diego, CA (US); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 17/999,673

(22) PCT Filed: Jun. 2, 2021

(86) PCT No.: PCT/CN2021/097846
§ 371 (c)(1),
(2) Date: Nov. 22, 2022

(87) PCT Pub. No.: WO2022/012199
PCT Pub. Date: Jan. 20, 2022

(65) Prior Publication Data
US 2023/0254029 A1    Aug. 10, 2023

(30) Foreign Application Priority Data

Jul. 16, 2020 (WO) ................ PCT/CN2020/102283

(51) Int. Cl.
*H04B 7/06* (2006.01)
(52) U.S. Cl.
CPC ......... *H04B 7/0695* (2013.01); *H04B 7/0626* (2013.01)

(58) Field of Classification Search
None
See application file for complete search history.

(56) References Cited

U.S. PATENT DOCUMENTS 10,477,417 B2   11/2019   Raghavan et al.
10,863,366 B2   12/2020   Nagaraja et al.
(Continued)

FOREIGN PATENT DOCUMENTS

CN   104919715 A   9/2015
CN   107733477 A   2/2018
(Continued)

OTHER PUBLICATIONS

Supplementary European Search Report—EP21841352—Search Authority—Munich—Jul. 1, 2024.
(Continued)

*Primary Examiner* — Willie J Daniel, Jr.
(74) *Attorney, Agent, or Firm* — Shumaker & Sieffert

(57) ABSTRACT

Aspects of the disclosure relate to user equipment (UE)-assisted beam broadening in a wireless communication system configured to employ beamforming. A UE may determine downlink channel characteristics by monitoring for, receiving, and measuring a suitable downlink reference signal. Based on the channel characteristics the UE may select a wide beam corresponding to a set of narrow beams. The UE may then transmit a report identifying the selected wide beam by indicating a direction of the selected wide beam and an angular width of the selected wide beam. Other aspects, embodiments, and features are also claimed and described.

30 Claims, 12 Drawing Sheets

(56) References Cited

U.S. PATENT DOCUMENTS

| | | |
|---|---|---|
| 10,938,460 B2 * | 3/2021 | Shang .................. H04B 7/0632 |
| 2013/0059619 A1 | 3/2013 | Kim et al. |
| 2014/0146863 A1 | 5/2014 | Seol et al. |
| 2016/0352396 A1 | 12/2016 | Seol et al. |
| 2017/0150487 A1 | 5/2017 | Zhou et al. |
| 2018/0076870 A1 | 3/2018 | Kim et al. |
| 2019/0165843 A1 | 5/2019 | Shang et al. |
| 2020/0145977 A1 | 5/2020 | Kumar et al. |

FOREIGN PATENT DOCUMENTS

| | | |
|---|---|---|
| CN | 110545129 A | 12/2019 |
| EP | 3547742 A1 | 10/2019 |
| WO | 2018237167 | 12/2018 |
| WO | 2019050986 | 3/2019 |

OTHER PUBLICATIONS

Apple Inc: "Consideration on Beam Measurement and Reporting Enhancement", 3GPP TSG RAN WG1 Meeting #95, R1-1812921, Spokane, USA, Nov. 12-16, 2018, the Whole Document, pp. 1-9.
International Search Report and Written Opinion—PCT/CN2020/102283—ISA/EPO—Apr. 22, 2021 9 pp.
International Search Report and Written Opinion—PCT/CN2021/097846—ISA/EPO—Aug. 27, 2021 9 pp.

* cited by examiner

USER EQUIPMENT-ASSISTED BEAM BROADENING

PRIORITY CLAIM

This application is a national stage application under 35 U.S.C. § 371 of PCT Application No. PCT/CN2021/097846, filed Jun. 2, 2021, which claims priority to and the benefit of PCT/CN2020/102283 filed in the China National Intellectual Property Administration on Jul. 16, 2020, the entire content of which is incorporated herein by reference as if fully set forth below in their entirety and for all applicable purposes.

TECHNICAL FIELD

The technology discussed below relates generally to wireless communication systems, and more particularly, to control signaling for employing beam broadening in a network configured for beamforming. Embodiments can provide and enable techniques for reducing control signaling overhead when employing beam broadening.

INTRODUCTION

Modem wireless communication systems often employ beamforming, or directional signal transmission or reception. For a beamformed transmission, the amplitude and phase of each antenna element in an antenna array may be precoded, or controlled to create a desired (e.g., directional) pattern of constructive and destructive interference in the wavefront. In general, the more antenna elements used for beamforming, the narrower the generated beam.

Beamforming has proven to be especially useful in millimeter-wave (mmW or mmWave) bands, where signals may not penetrate well and may quickly attenuate over distance. Here, mmWave generally refers to high bands above 24 gigahertz (GHz), which can provide a very large bandwidth.

In some cellular networks, beam management for beamforming may be realized by implementing beam sweeping, beam detection and measurement, beam-level mobility, beam failure and recovery, and other such beam management processes and procedures. In some examples, a cell may support beamforming by enabling a mobile device to distinguish between different directional beams based on features of a transmitted reference signal. For example, each beam may include a separate reference signal that indicates a beam index. Here, a mobile device may measure such reference signal and select a suitable beam and/or perform its own beam sweep. After acquisition, for downlink communication, a mobile device may measure a beam-specific reference signal, and report channel information (e.g., reporting best/preferred beam(s)) to the base station. For uplink communication, a base station may measure a mobile device's uplink reference signal transmission, and may accordingly select the best uplink beam for the mobile device.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method of wireless communication operable at a user equipment (UE) is provided, where the UE is configured for operation in a cell configured for downlink beamforming over a plurality of directional beams. The method includes receiving a first reference signal on a downlink resource. The method also includes selecting a beam corresponding to one or more directional beams of the plurality of directional beams, based on a set of one or more channel characteristics that are based on the reference signal. The method further includes transmitting a report identifying the selected beam by indicating a direction of the selected beam and an angular width of the selected beam.

In another example, a user equipment (UE) is provided that is configured for wireless communication in a cell configured for downlink beamforming over a plurality of directional beams. The UE includes means for receiving a first reference signal on a downlink resource. The UE also includes means for selecting a beam corresponding to one or more directional beams of the plurality of directional beams, based on a set of one or more channel characteristics that are based on the reference signal. The UE further includes means for transmitting a report identifying the selected beam by indicating a direction of the selected beam and an angular width of the selected beam.

In another example, a non-transitory computer-readable medium storing computer-executable code, operable at a user equipment (UE) is provided, where the UE is configured for operation in a cell configured for downlink beamforming over a plurality of directional beams. The non-transitory computer-readable medium includes code for causing the UE to receive a first reference signal on a downlink resource. The non-transitory computer-readable medium also includes code for causing the UE to select a beam corresponding to one or more directional beams of the plurality of directional beams, based on a set of one or more channel characteristics that are based on the reference signal. The non-transitory computer-readable medium further includes code for causing the UE to transmit a report identifying the selected beam by indicating a direction of the selected beam and an angular width of the selected beam.

In another example, a user equipment (UE) is provided that is configured for wireless communication in a cell configured for downlink beamforming over a plurality of directional beams. The UE includes a processor, a transceiver communicatively coupled to the processor; and a memory communicatively coupled to the processor. The processor and the memory are configured to receive, via the transceiver, a first reference signal on a downlink resource. The processor and the memory are also configured to select a beam corresponding to one or more directional beams of the plurality of directional beams based on a set of one or more channel characteristics that are based on the reference signal. The processor and the memory are further configured to transmit, via the transceiver, a report identifying the selected beam by indicating a direction of the selected beam and an angular width of the selected beam.

These and other aspects of the technology discussed herein will become more fully understood upon a review of the detailed description, which follows. Other aspects, features, and embodiments will become apparent to those of ordinary skill in the art upon reviewing the following description of specific, exemplary embodiments in conjunction with the accompanying figures. While the following description may discuss various advantages and features relative to certain embodiments and figures, all embodiments can include one or more of the advantageous features discussed herein. In other words, while this description may discuss one or more embodiments as having certain advantageous features, one or more of such features may also be used in accordance with the various embodiments discussed herein. In similar fashion, while this description may discuss exemplary embodiments as device, system, or method embodiments, it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip (IC) embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may span over a spectrum from chip-level or modular components to non-modular, non-chip-level implementations and further to aggregate, distributed, or original equipment manufacturer (OEM) devices or systems incorporating one or more aspects of the disclosed technology. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that the disclosed technology may be practiced in a wide variety of devices, chip-level components, systems, distributed arrangements, end-user devices, etc. of varying sizes, shapes and constitution.

Figure 1:
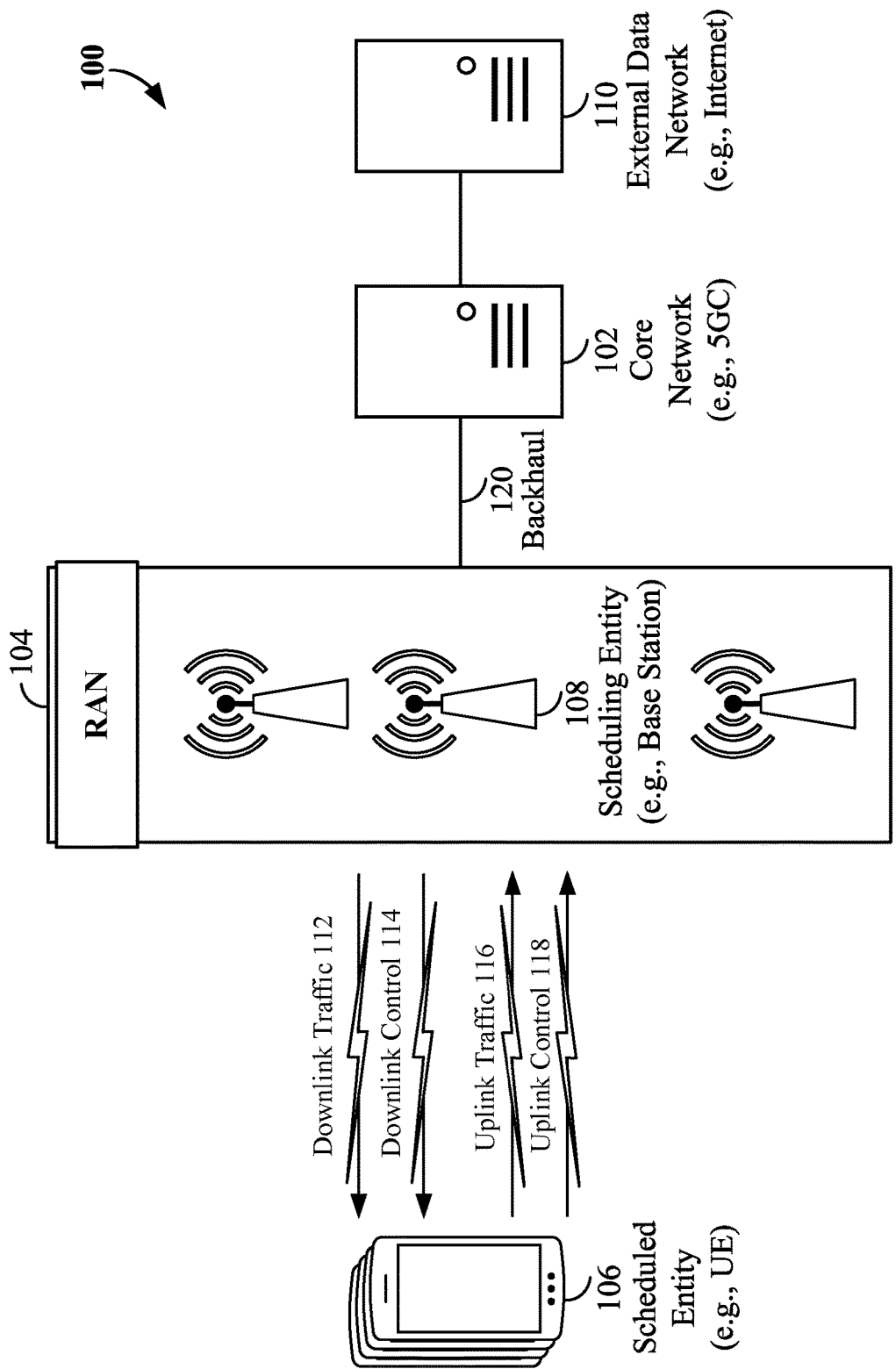
FIG. 1 is a schematic illustration of a wireless communication system according to some aspects.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G or 5G NR. In some examples, the RAN 104 may operate under a hybrid of 5G NR and Evolved Universal Terrestrial Radio Access Network (eUTRAN) standards, often referred to as Long-Term Evolution (LTE). 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, those skilled in the art may variously refer to a "base station" as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The RAN 104 supports wireless communication for multiple mobile apparatuses. Those skilled in the art may refer to a mobile apparatus as a UE, as in 3GPP specifications, but may also refer to a UE as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (aka a UE) need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
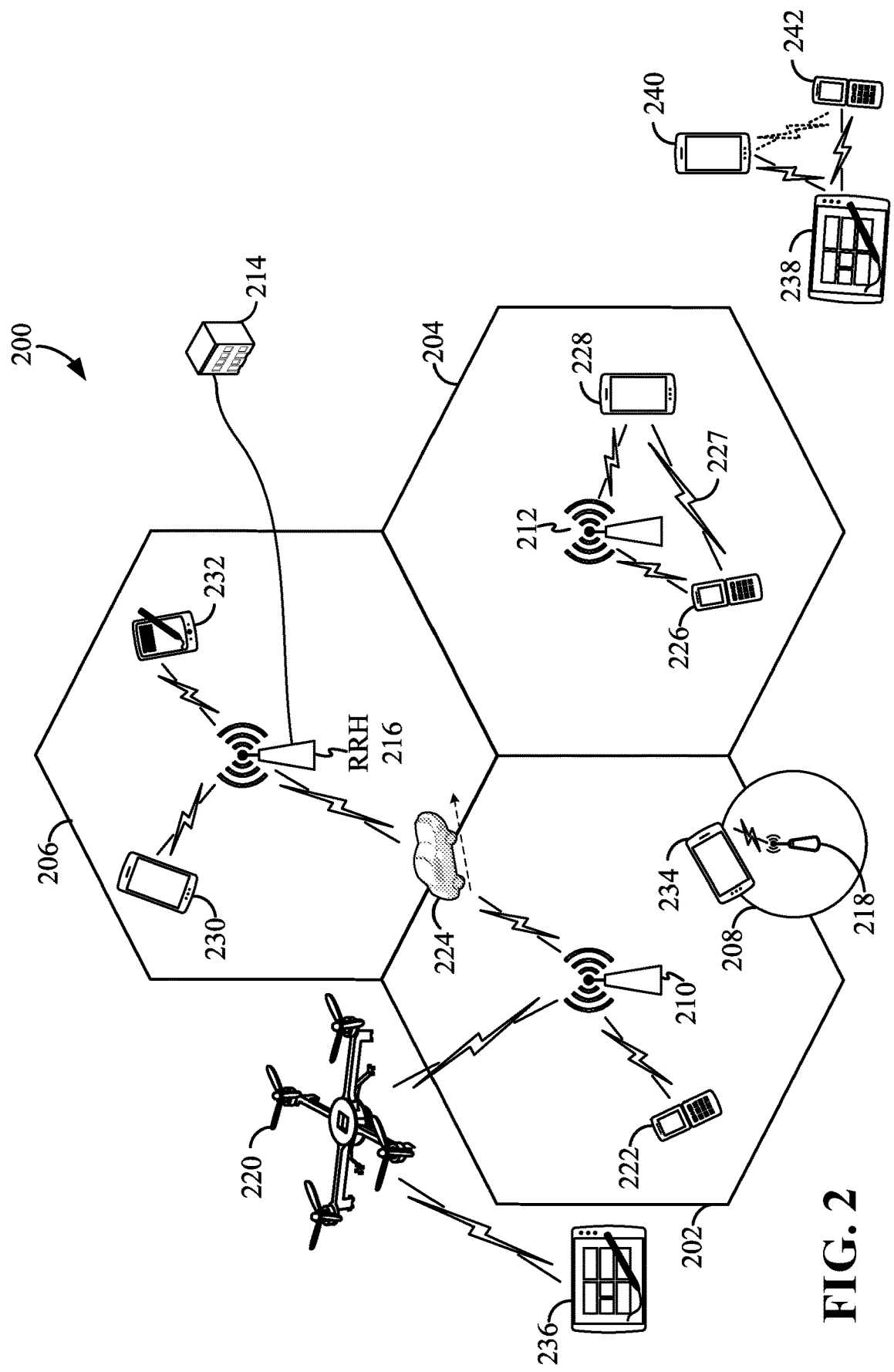
FIG. 2 is a conceptual illustration of an example of a radio access network according to some aspects.

FIG. 2 provides a schematic illustration of a RAN 200, by way of example and without limitation. In some examples, the RAN 200 may be the same as the RAN 104 described above and illustrated in FIG. 1. The geographic area covered by the RAN 200 may be divided into cellular regions (cells) that a user equipment (UE) can uniquely identify based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

FIG. 2 shows two base stations 210 and 212 in cells 202 and 204; and shows a third base station 214 controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

The RAN 200 may include any number of wireless base stations and cells. Further, a RAN may include a relay node to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

The air interface in the RAN 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time utilizing a given resource. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes. For example, a UE may provide for UL multiple access utilizing time division multiple access (TDMA), code division multiple access (CDMA), frequency division multiple access (FDMA), sparse code multiple access (SCMA), resource spread multiple access (RSMA), or other suitable multiple access schemes. Further, a base station may multiplex DL transmissions to UEs utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In some examples, a frame may refer to a predetermined duration of time (e.g., 10 ms) for wireless transmissions. And further, each frame may consist of a set of subframes (e.g., 10 subframes of 1 ms each). A given carrier may include one set of frames in the UL, and another set of frames in the DL. Each subframe (e.g., a 1 ms subframe) may consist of one or multiple adjacent slots. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). A base station may in some cases transmit these mini-slots occupying resources scheduled for ongoing slot transmissions for the same or for different UEs.

A portion of wireless resources may be scheduled to carry one or more physical channels, including control channels, shared channels, data channels, etc. Other wireless resources may also carry pilots or reference signals. These pilots or reference signals may provide for a receiving device to perform channel estimation of the corresponding channel, which may enable coherent demodulation/detection of the control and/or data channels.

In a DL transmission, the transmitting device (e.g., the scheduling entity 108) may allocate DL resources to carry DL control information 114 including one or more DL control channels that generally carry information originating from higher layers, such as a physical broadcast channel (PBCH), a physical downlink control channel (PDCCH), etc., to one or more scheduled entities 106. In addition, DL resources may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

A base station may transmit the synchronization signals PSS and SSS (collectively referred to as SS), and in some examples, the PBCH, in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other nonlimiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize allocated UL resources to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., are quest for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include hybrid automatic repeat request (HARQ) feedback such as an acknowledgment (ACK) or negative acknowledgment (NACK), a channel state information (CSI) report, or any other suitable UL control information.

In addition to control information, one or more REs (e.g., within a data region) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. The RAN may provide this system information utilizing minimum system information (MSI), and other system information (OSI). The RAN may periodically broadcast the MSI over the cell to provide the most basic information a UE requires for initial cell access, and for enabling a UE to acquire any OSI that the RAN may broadcast periodically or send on-demand. In some examples, a network may provide MSI over two different downlink channels. For example, the PBCH may carry a master information block (MIB), and the PDSCH may carry a system information block type 1 (SIB1). Here, the MIB may provide a UE with parameters for monitoring a control resource set. The control resource set may thereby provide the UE with scheduling information corresponding to the PDSCH, e.g., a resource location of SIB1. In the art, SIB1 may be referred to as remaining minimum system information (RMSI).

OSI may include any SI that is not broadcast in the MSI. In some examples, the PDSCH may carry a plurality of SIBs, not limited to SIB1, discussed above. Here, the RAN may provide the OSI in these SIBs, e.g., SIB2 and above.

The channels or carriers described above are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

In some examples, a physical layer may generally multiplex and map these physical channels described above to transport channels for handling at a medium access control (MAC) layer entity. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 3:
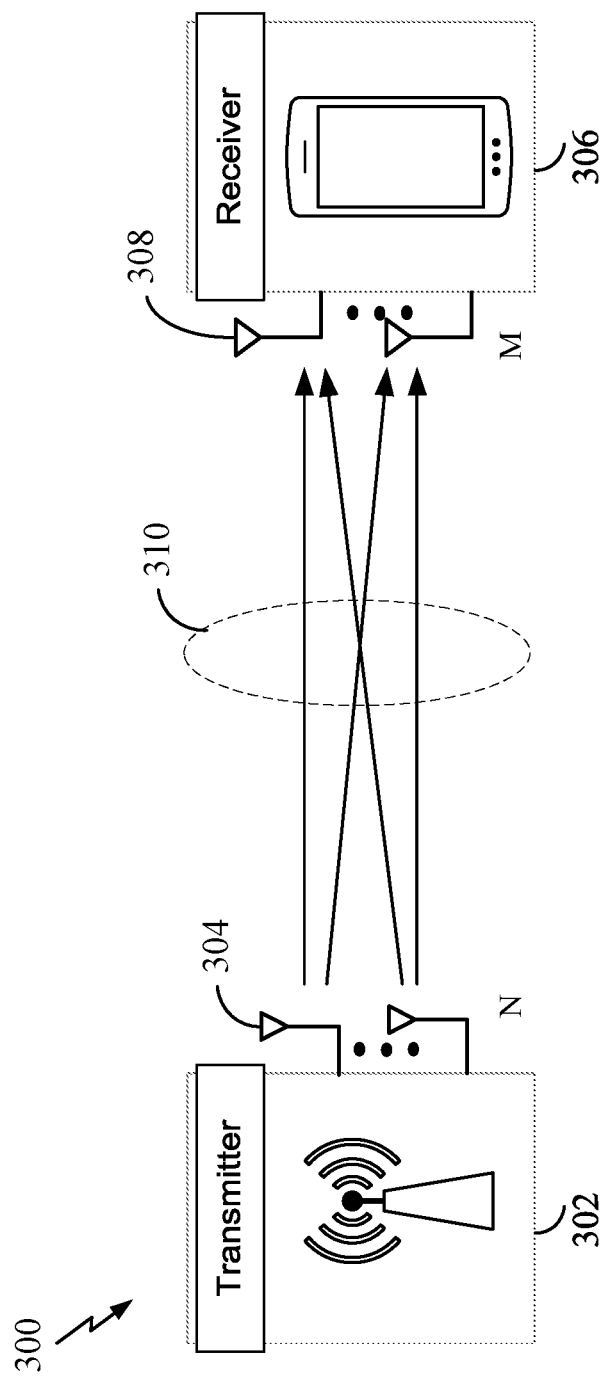
FIG. 3 is a block diagram illustrating a wireless communication system supporting multiple-input multiple-output (MIMO) communication.

In some aspects of the disclosure, the scheduling entity and/or scheduled entity may be configured with multiple antennas for beamforming and/or multiple-input multiple-output (MIMO) technology. FIG. 3 illustrates an example of a wireless communication system 300 with multiple antennas, supporting beamforming and/or MIMO. The use of such multiple antenna technology enables the wireless communication system to exploit the spatial domain to support spatial multiplexing, beamforming, and transmit diversity.

Beamforming generally refers to directional signal transmission or reception. For a beamformed transmission, a transmitting device may precode, or control the amplitude and phase of each antenna in an array of antennas to create a desired (e.g., directional) pattern of constructive and destructive interference in the wavefront. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

In a MIMO system, spatial multiplexing may be used to transmit multiple different streams of data, also referred to as layers, simultaneously on the same time-frequency resource. In some examples, a transmitter 302 may send multiple data streams to a single receiver. In this way, a MIMO system takes advantage of capacity gains and/or increased data rates associated with using multiple antennas in rich scattering environments where channel variations can be tracked. Here, the receiver 306 may track these channel variations and provide corresponding feedback to the transmitter 302. In the simplest case, as shown in FIG. 3, a rank-2 (i.e., including 2 data streams) spatial multiplexing transmission on a 2×2 MIMO antenna configuration will transmit two data streams via two transmit antennas 304. The signal from each transmit antenna 304 reaches each receive antenna 308 along a different signal path 310. The receiver 306 may then reconstruct the data streams using the received signals from each receive antenna 308.

In some examples, a transmitter may send multiple data streams to multiple receivers. This is generally referred to as multi-user MIMO (MU-MIMO). In this way, a MU-MIMO system exploits multipath signal propagation to increase the overall network capacity by increasing throughput and spectral efficiency, and reducing the required transmission energy. This is achieved by a transmitter 302 spatially precoding (i.e., multiplying the data streams with different weighting and phase shifting) each data stream (in some examples, based on known channel state information) and then transmitting each spatially precoded stream through multiple transmit antennas to the receiving devices using the same allocated time-frequency resources. A receiver (e.g., receiver 306) may transmit feedback including a quantized version of the channel so that the transmitter 302 can schedule the receivers with good channel separation. The spatially precoded data streams arrive at the receivers with different spatial signatures, which enables the receiver(s) (in some examples, in combination with known channel state information) to separate these streams from one another and recover the data streams destined for that receiver. In the other direction, multiple transmitters can each transmit a spatially precoded data stream to a single receiver, which enables the receiver to identify the source of each spatially precoded data stream.

The number of data streams or layers in a MIMO or MU-MIMO (generally referred to as MIMO) system corresponds to the rank of the transmission. In general, the rank of a MIMO system is limited by the number of transmit or receive antennas 304 or 308, whichever is lower. In addition, the channel conditions at the receiver 306, as well as other considerations, such as the available resources at the transmitter 302, may also affect the transmission rank. For example, a base station in a RAN (e.g., transmitter 302) may assign a rank (and therefore, a number of data streams) for a DL transmission to a particular UE (e.g., receiver 306) based on a rank indicator (RI) the UE transmits to the base station. The UE may determine this RI based on the antenna configuration (e.g., the number of transmit and receive antennas) and a measured signal-to-interference-and-noise ratio (SINR) on each of the receive antennas. The RI may indicate, for example, the number of layers that the UE may support under the current channel conditions. The base station may use the RI along with resource information (e.g., the available resources and amount of data to be scheduled for the UE) to assign a DL transmission rank to the UE.

The transmitter 302 determines the precoding of the transmitted data stream or streams based, e.g., on known channel state information of the channel on which the transmitter 302 transmits the data stream(s). For example, the transmitter 302 may transmit one or more suitable reference signals (e.g., a channel state information reference signal, or CSI-RS) that the receiver 306 may measure. The receiver 306 may then report measured channel quality information (CQI) back to the transmitter 302. This CQI generally reports the current communication channel quality, and in some examples, a requested transport block size (TBS) for future transmissions to the receiver. In some examples, the receiver 306 may further report a precoding matrix indicator (PMI) to the transmitter 302. This PMI generally reports the receiver's 306 preferred precoding matrix for the transmitter 302 to use, and may be indexed to a predefined codebook. The transmitter 302 may then utilize this CQI/PMI to determine a suitable precoding matrix for transmissions to the receiver 306.

In Time Division Duplex (TDD) systems, the UL and DL may be reciprocal, in that each uses different time slots of the same frequency bandwidth. Therefore, in TDD systems, a transmitter 302 may assign a rank for DL MIMO transmissions based on an UL SINR measurement (e.g., based on a sounding reference signal (SRS) or other pilot signal transmitted from the receiver 306). Based on the assigned rank, the transmitter 302 may then transmit a channel state information reference signal (CSI-RS) with separate sequences for each layer to provide for multi-layer channel estimation. From the CSI-RS, the receiver 306 may measure the channel quality across layers and resource blocks. The receiver 306 may then transmit a CSI report (including, e.g., CQI, RI, and PMI) to the transmitter 302 for use in updating the rank and assigning resources for future DL transmissions.

Beamforming generally refers to directional signal transmission or reception. For a beamformed transmission, the amplitude and phase of each antenna element in an antenna array may be precoded, or controlled to create a desired (e.g., directional) pattern of constructive and destructive interference in the wavefront. In general, the more antenna elements used for beamforming, the narrower the generated beam. Beamforming has proven to be especially useful in millimeter-wave (mmW or mmWave) bands, where signals may not penetrate well and may quickly attenuate over distance. Here, mmWave generally refers to high bands above 24 GHz, which can provide a very large bandwidth.

In existing specifications for 3GPP 5G NR, beam management for beamforming is realized with a variety of features and operations, including beam sweeping, beam detection and measurement, beam-level mobility, and beam failure and recovery. In some examples, a cell may support beamforming by enabling a UE to distinguish between different directional beams based on features of the synchronization signal/PBCH block (SSB). For example, each beam may include a separate SSB that indicates a beam index. Here, a UE may measure such SSBs and select a suitable beam and/or perform its own beam sweep. After acquisition, for DL communication, a UE may measure a beam-specific reference signal (e.g., CSI-RS), and report channel information (e.g., reporting best/preferred beam(s)) to the base station. For UL communication, a base station may measure a UE's UL reference signal transmission (e.g., SRS), and may accordingly select the best UL beam for the UE.

Some aspects of the present disclosure relate to DL beam selection in a cell that employs beamforming. To provide further details and examples, a conventional procedure for DL beam selection in a wireless communication network configured according to 3GPP specifications for 5G NR is described. However, this discussion is not intended to limit the scope of the present disclosure to this RAT, or this exemplary set of procedures.

In a conventional DL beamforming procedure, a base station (e.g., gNB) may transmit a certain CSI report configuration message to a UE to configure the UE's CSI report. And further, the gNB may transmit one or more reference signals (e.g., CSI-RS) on suitable DL resources. A UE may determine channel characteristics of the DL channel based on the CSI-RS, and accordingly select a suitable beam direction based on the measurement. The UE may then generate and transmit a CSI report, based on the CSI report configuration message, and including the determined beam information. For example, a CSI report may include a channel quality indicator (CQI), a rank indicator (RI), a precoding matrix indicator (PMI), etc. In some examples, a UE may configure the PMI report based on one or more selected DL beams (e.g., narrow beams). The gNB may then generate a DL beam based on the UE's CSI report, and transmit data/signaling to the UE utilizing the generated beam.

In a particular example, for DL beam selection, a UE may generate a PMI report corresponding to one or more selected narrow beams. If a beam that is precoded based on the UE's PMI report propagates in an accurate direction toward the UE, then such a narrow beam can provide a large beamforming gain. The specific format of the PMI report may vary, and in some examples, may include beam information in the form of codewords selected from a suitable codebook, e.g., a type-1 codebook or a type-2 codebook.

With a type-1 codebook, a UE's PMI report includes a set of codewords that represent a number of narrow beams. Here, a type-1 codebook provides a representation of beam weights that treats each beam m as being made up of a horizontal beam component and a vertical beam component. For example, a PMI report based on a type-1 codebook may include a set of codewords $\{u_m, v_{l,m}\}$ for one or more beams m, and/or one or more layers l. $u_m$ is a codeword corresponding to a horizontal beam component for beam m:

$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$$

And $v_{l,m}$ is a codeword corresponding to a vertical beam component for beam m and for layer l:

$$v_{l,m} = \begin{bmatrix} u_m & e^{j\frac{2\pi l}{O_1 N_1}} u_m & \cdots & e^{j\frac{2\pi l(N_2-1)}{O_2 N_2}} u_m \end{bmatrix}^T$$

In the above equations, $N_1$ and $N_2$ are the numbers of rows and columns, respectively, of antenna elements in an antenna panel; and $O_1$ and $O_2$ are the oversampling factors for vertical beam direction and the horizontal beam direction, respectively.

With a type-2 codebook, a UE's PMI report includes a set of codewords that represent a linear weighted sum of narrow beams. Here, a PMI report based on a type-2 codebook may include a set of codewords $W^l_{q_1,q_2,n_1,n_2,p_l^{(1)},p_l^{(2)},c_l}$ for one or more such linear weighted sums of narrow beams as follows:

$$W^l_{q_1,q_2,n_1,n_2,p_l^{(1)},p_l^{(2)},c_l} = \frac{1}{\sqrt{N_1 N_2 \sum_{i=0}^{2L-1}\left(p_{l,i}^{(1)},p_{l,i}^{(2)}\right)^2}} \begin{bmatrix} \sum_{i=0}^{L-1} v_{m_1^{(i)},m_2^{(i)}} p_{l,i}^{(1)} p_{l,i}^{(2)} \varphi_{l,i} \\ \sum_{i=0}^{L-1} v_{m_1^{(i)},m_2^{(i)}} p_{l,i}^{(1)} p_{l,i+L}^{(2)} \varphi_{l,i+L} \end{bmatrix}, l = 1, 2$$

where $v$ represents a component narrow beam, q represents an oversampling offset, n represents a non-oversampling narrow beam index, l represents a spatial layer, p represents an amplitude weight, and $\varphi$ represents a phase weight.

Figure 4B:
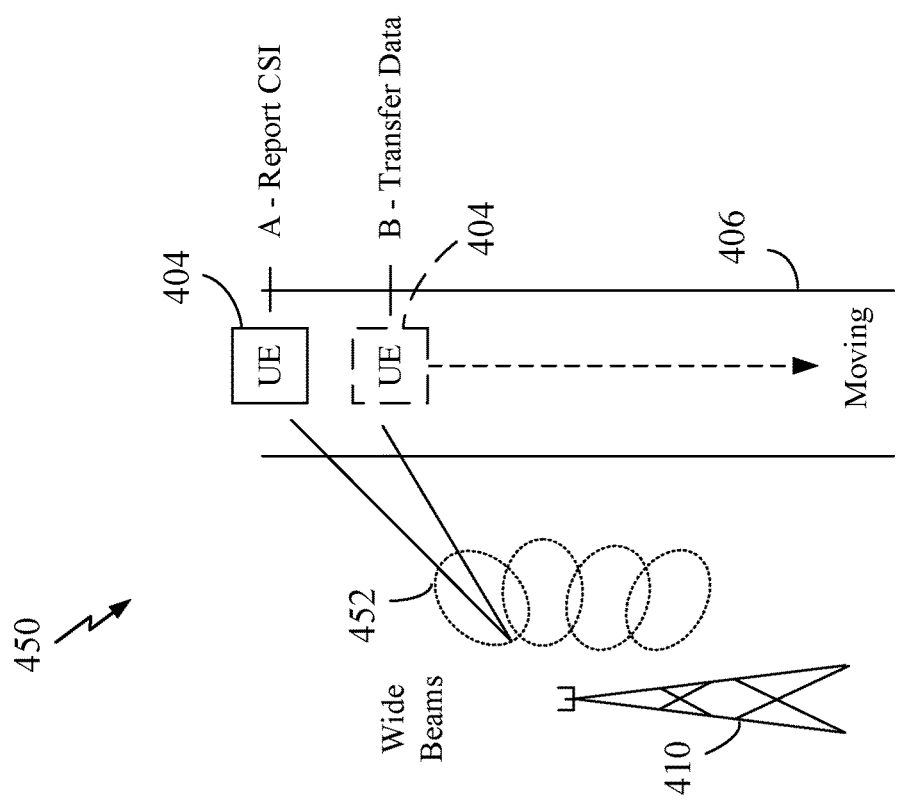
FIGS. 4A-4B are a schematic illustration of a conventional beam broadening procedure.
Figure 4A:
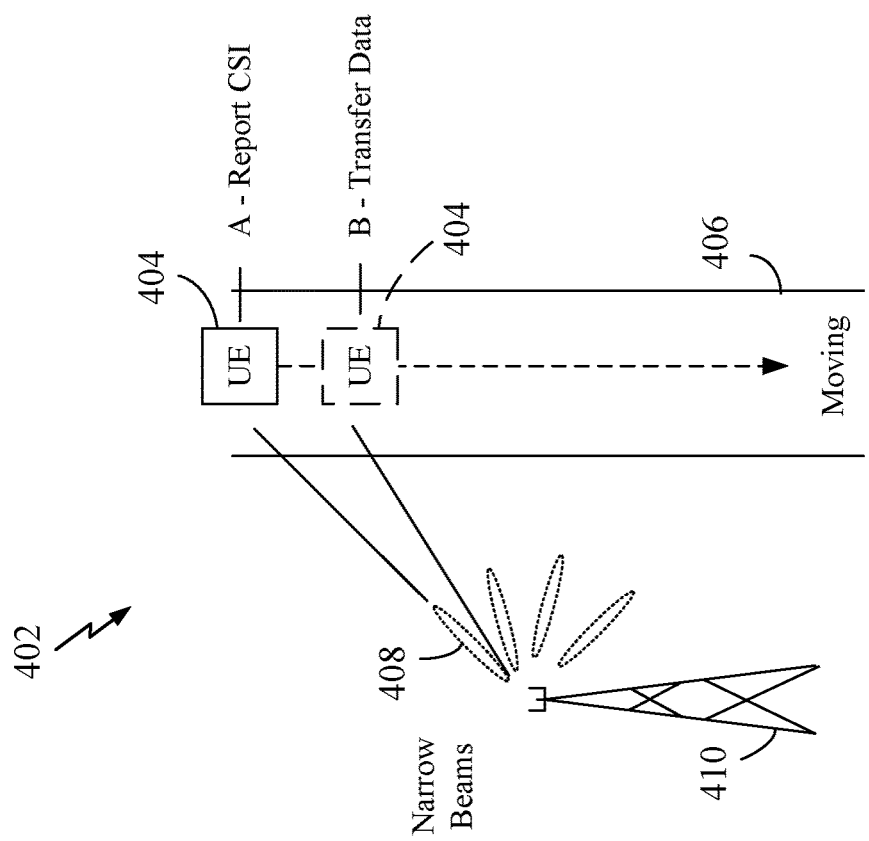

Referring now to FIGS. 4A-B, a potential issue for such a beamforming scheme that may arise when a UE's radio channel has fast time variance is described. With a stable channel (e.g., experienced by a slow or stationary UE), a narrow beam that a UE selects as a best beam can remain the best beam for an extended time. Thus, a gNB can use the UE's reported selected beam to reliably configure its next DL PDSCH data transfer to that UE. However, it has been observed that the beamforming gain, as well as the index number of the strongest beam, are fast variant in a high-speed channel. Especially in the case of a long CSI report period, a high-speed channel may lead to a loss of beamforming gain, and decoding errors. In FIG. 4A, example scenario 402 provides a conceptual illustration of a fast-moving UE 404, such as a UE in a moving vehicle on a road 406, employing beamforming as described above.

In the illustrated example scenario 402, the fast-moving UE 404 may select a narrow beam 408 of a gNB base station 410, and determine a CSI report that identifies the selected beam 408 based on an RS measurement at position/time A. The gNB 410 may receive the CSI report and generate a DL beam based on the CSI report. Accordingly, the gNB 410 may transmit data/signaling to the UE using the generated beam. However, the latency inherent to this procedure is potentially multiple slots in duration, including propagation delay of wireless transmissions in both directions, processing time at the UE 404 and at the gNB 410, and depending on the scheduler, may further include delays at either side waiting for scheduled resources to be available for transmission. Over this time, the reported beam corresponding to position/time A can substantially deviate from an actual beam that a fast-moving UE 404 receives at position/time B, potentially resulting in a transfer failure. In general, as a UE's speed increases, the beamforming gain decreases.

Referring now to FIG. 4B example scenario 450, some aspects of a conventional approach to address these issues are shown. That is, to address a fast time-varying radio channel, e.g., caused by a fast-moving UE 404, a gNB 410 may employ beam broadening, generating a wider beam 452 for the DL transmission. Here a wide beam 452 may refer to a beam having a larger angular width than a narrow beam (e.g., narrow beam 408). For example, a wide beam 452 may have a width corresponding to a combined angular width of two or more narrow beams 408. A narrow beam may be a directional beam indicated by or indexed by a codebook, such as a type-1 codebook. In other words, the gNB 410 may apply suitable precoding to the DL transmission to transmit a beam having a wider angular width. By providing for a wide beam, a gNB 410 may provide a beamforming gain that is generally more robust to a beam direction change than that of a narrow beam. For example, such a wide beam 452 can increase the data transfer success rate, and thus increase the throughput of data transfer in fast time-variant radio channels. However, this robustness may result in a trade-off, coming with the cost of a degradation of the peak beamforming gain.

By employing beam broadening, if a gNB knows a UE's spatial position, the gNB can readily generate a wide beam to cover that position. And as discussed above, a TDD carrier may exhibit DL-UL reciprocity. Thus, when communicating over a TDD carrier, a gNB may readily select a beam direction for a DL transmission to a given UE based on measurement of an UL reference signal (e.g., SRS) it receives from the UE. However, in FDD systems without DL-UL reciprocity or a TDD system that does not exhibit DL-UL reciprocity, a gNB cannot generally determine a UE's spatial position, or DL channel characteristics for that UE, based on an UL reference signal. In these systems, a gNB may configure a UE to measure the DL channel based on a DL reference signal (e.g., CSI-RS), and to report a suitable PMI indicating a beam direction or beam selection based on that measurement. When utilizing currently known beam broadening procedures, a UE generally provides a CSI report that identifies a set of narrow beams corresponding to a set of preferred beam directions based on the DL channel measurements. The gNB then generates a wide beam to cover the reported narrow beams.

However, in 3GPP specifications for 5G NR, for example, a PMI report for a given narrow beam may make up a substantial quantity of information. Thus, especially if the quantity of reported beams is large, such beam broadening can result in a greatly increased PMI report payload. This can decrease spectrum efficiency and cell coverage.

In various aspects, the present disclosure provides for UE-assisted beam broadening with a reduced PMI report payload. In some examples, by employing aspects of the presently disclosed UE-assisted beam broadening, a wireless communication network may obtain the improved beamforming gain and performance provided with conventional beam broadening, without suffering the same blow to spectrum efficiency and cell coverage that it causes.

Figure 5:
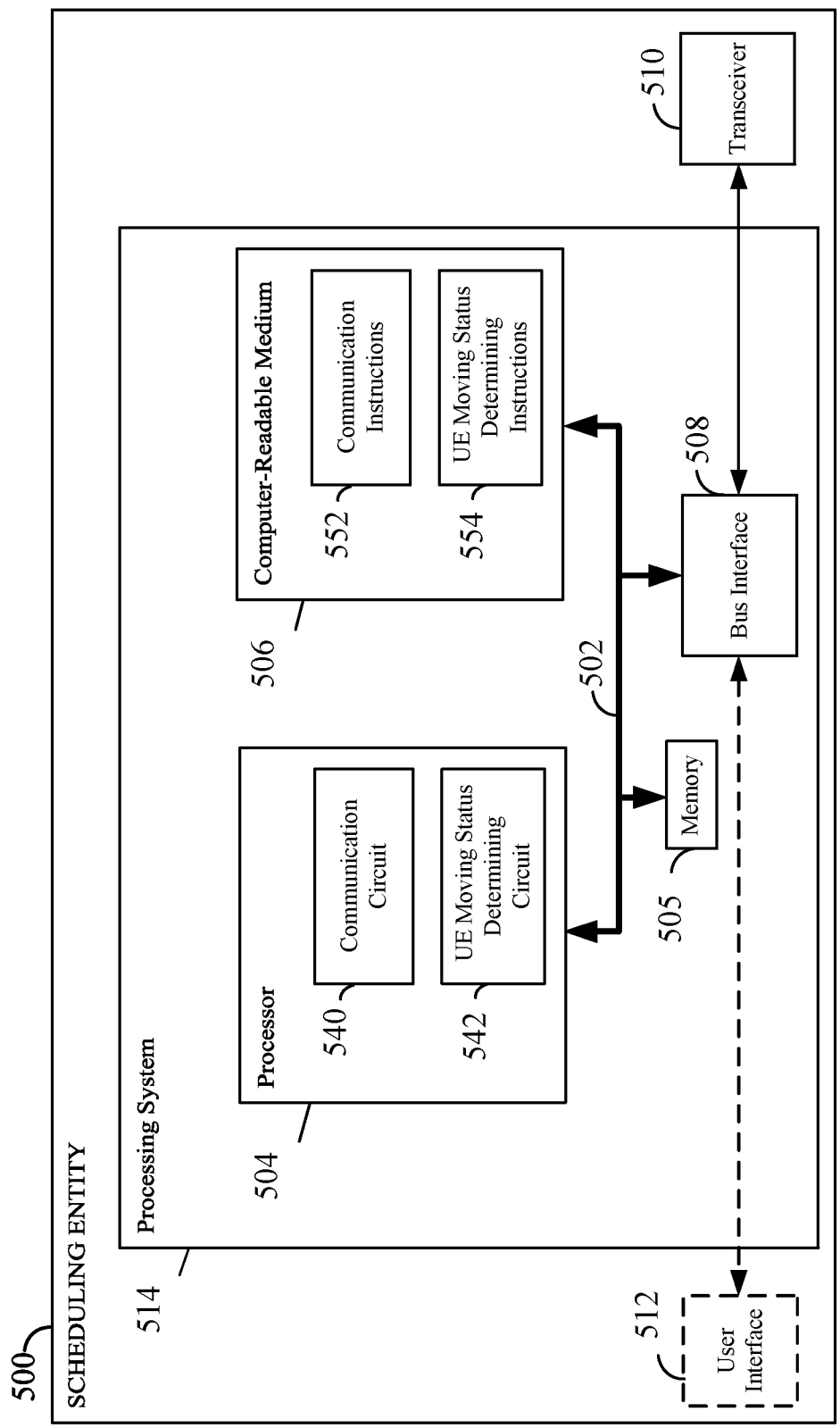
FIG. 5 is a block diagram conceptually illustrating an example of a hardware implementation for a scheduling entity according to some aspects of the disclosure.

FIG. 5 is a block diagram illustrating an example of a hardware implementation for a scheduling entity 500 employing a processing system 514 and configured for UE-assisted beam broadening according to some aspects of the present disclosure. In accordance with various aspects of the disclosure, an element, or any portion of an element, or any combination of elements may be implemented with a processing system 514 that includes one or more processors 504. For example, the scheduling entity 500 may be a user equipment (UE) as illustrated in any one or more of FIGS. 1, 2, 3, 4A and/or 4B. In another example, the scheduling entity 500 may be a base station, eNB, or gNB as illustrated in any one or more of FIGS. 1, 2, 3, 4A, and/or 4B.

The scheduling entity 500 may include a processing system 514 having one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 500 may be configured to perform any one or more of the functions described herein. That is, the processor 504, as utilized in a scheduling entity 500, may be configured (e.g., in coordination with the memory 505) to implement any one or more of the processes and procedures described below and illustrated in FIGS. 8-12.

The processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a communication interface or means for communicating with various other apparatus over a transmission medium. Depending upon the nature of the apparatus, a user interface 512 (e.g., keypad, display, speaker, microphone, joystick) may also be provided. Of course, such a user interface 512 is optional, and some examples, such as a base station, may omit it.

In some aspects of the disclosure, the processor 504 may include communication circuitry 540 configured (e.g., in coordination with the memory 505) for various functions, including, e.g., transmitting a downlink and/or receiving an uplink, determining and implementing beamforming, etc. In further aspects, the processor 504 may include UE moving status determination circuitry 542 configured (e.g., in coordination with the memory 505) for various functions, including, e.g., determining a moving status of a UE, and determining whether to employ beam broadening based on the moving status.

The processor 504 is responsible for managing the bus 502 and general processing, including the execution of software stored on the computer-readable medium 506. The software, when executed by the processor 504, causes the processing system 514 to perform the various functions described below for any particular apparatus. The processor 504 may also use the computer-readable medium 506 and the memory 505 for storing data that the processor 504 manipulates when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable medium 506 may store computer-executable code that includes communication instructions 560 that configure a scheduling entity 500 for various functions, including, e.g., transmitting a downlink and/or receiving an uplink, determining and implementing beamforming, etc. The computer-readable medium 506 may further store computer-executable code that includes UE moving status determination instructions 562 that configure a scheduling entity 500 for various functions, including, e.g., determining a moving status of a UE, and determining whether to employ beam broadening based on the moving status.

In one configuration, the apparatus 500 for wireless communication includes means for transmitting a downlink and/or receiving an uplink, determining and implementing beamforming, and means for determining a moving status of a UE, and determining whether to employ beam broadening based on the moving status. In one aspect, the aforementioned means may be the processor(s) 504 shown in FIG. 5 configured to perform the functions recited by the aforementioned means. In another aspect, the aforementioned means may be a circuit or any apparatus configured to perform the functions recited by the aforementioned means.

Of course, in the above examples, the circuitry included in the processor 504 is merely provided as an example, and other means for carrying out the described functions may be included within various aspects of the present disclosure, including but not limited to the instructions stored in the computer-readable medium 506, or any other suitable apparatus or means described in any one of the FIGS. 1, 2, 3, 4A, 4B, 7, 8, 9, and/or 10 and utilizing, for example, the processes and/or algorithms described herein in relation to FIGS. 8-12.

Figure 6:
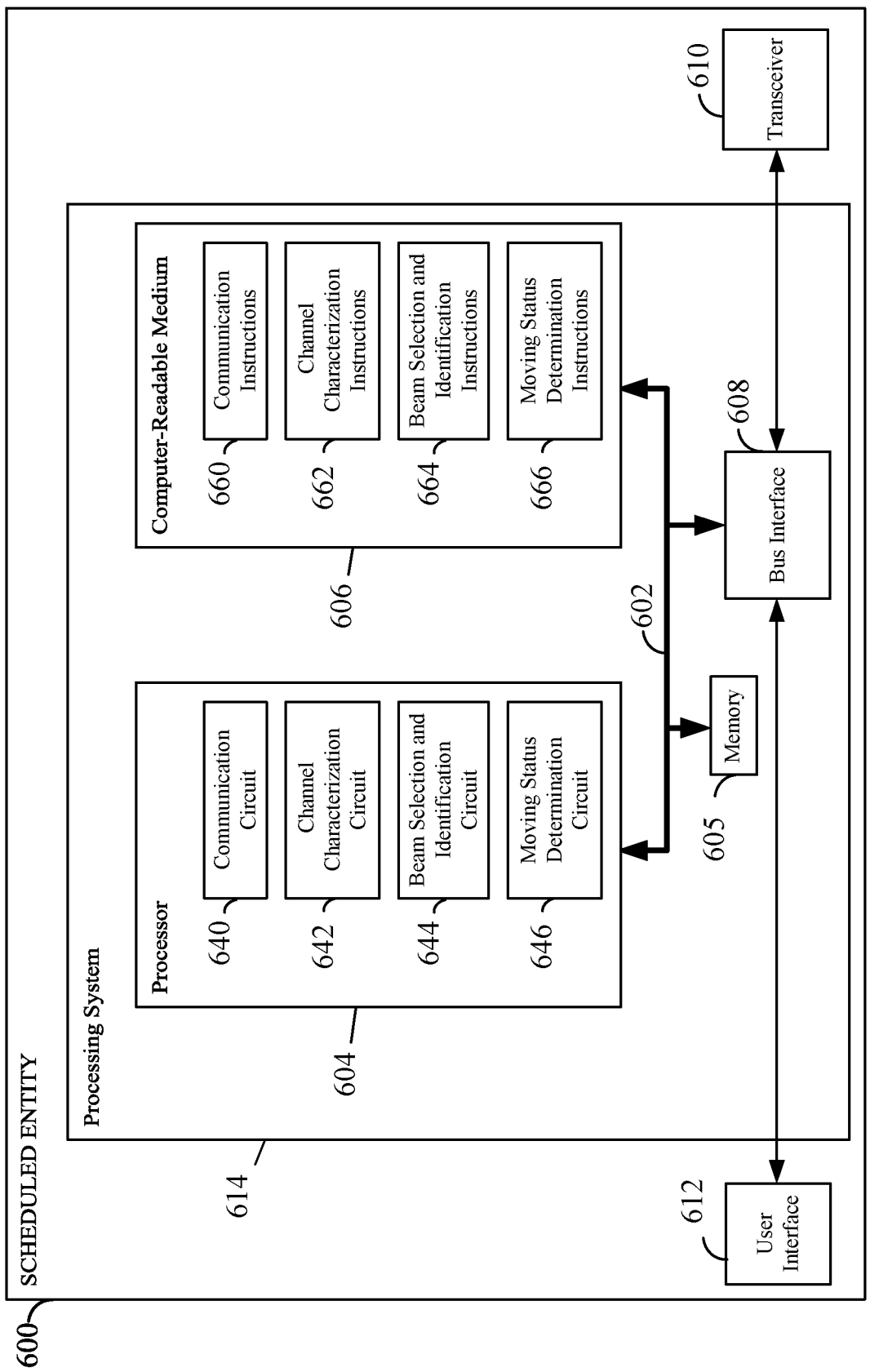
FIG. 6 is a block diagram conceptually illustrating an example of a hardware implementation for a scheduled entity according to some aspects of the disclosure.

FIG. 6 is a conceptual diagram illustrating an example of a hardware implementation for an exemplary scheduled entity 600 employing a processing system 614 and configured for UE-assisted beam broadening according to some aspects of the present disclosure. In accordance with various aspects of the disclosure, a processing system 614 may include an element, or any portion of an element, or any combination of elements having one or more processors 604. For example, the scheduled entity 600 may be a user equipment (UE) as illustrated in any one or more of FIGS. 1, 2, 3, 4A, 4B, 7, 9, and/or 10.

The processing system 614 may be substantially the same as the processing system 514 illustrated in FIG. 5, including a bus interface 608, a bus 602, memory 605, a processor 604, and a computer-readable medium 606. Furthermore, the scheduled entity 600 may include a user interface 612 and a transceiver 610 substantially similar to those described above in FIG. 5. That is, the processor 604, as utilized in a scheduled entity 600, may be configured (e.g., in coordination with the memory 605) to implement any one or more of the processes described below and illustrated in FIG. 8-12.

In some aspects of the disclosure, the processor 604 may include communication circuitry 640 configured (e.g., in coordination with the memory 605) for various functions, including, for example, transmitting uplink information and/or receiving downlink information. For example, the communication circuitry 640 may be configured to implement one or more of the functions described below in relation to FIG. 11, including, e.g., block 1108, and/or one or more of the functions described below in relation to FIG. 12, including, e.g., block 1202, 1210, 1220, and/or 1226. The processor 604 may further include channel characterization circuitry 642 configured (e.g., in coordination with the memory 605) for various functions, including, for example, receiving a reference signal and determining channel characteristics based on the reference signal. For example, the channel characterization circuitry 642 may be configured to implement one or more of the functions described below in relation to FIG. 11, including, e.g., blocks 1102 and/or 1106, and/or one or more of the functions described below in relation to FIG. 12, including, e.g., block 1204, 1206, 1222, 1224, and/or 1226. The processor 604 may further include beam selection and identification circuitry 644 configured (e.g., in coordination with the memory 605) for various functions, including, for example, selecting a DL beam (e.g., a wide beam) based on channel characteristics; selecting a direction corresponding to the selected beam; selecting an angular width of the selected beam to cover multiple narrow beams; indicating an angular width of a selected beam based on a horizontal component and a vertical component; and/or indicating an angular width of a selected beam based on a number of narrow beams the selected wide beam covers. For example, the beam selection and identification circuitry 644 may be configured to implement one or more of the functions described below in relation to FIG. 11, including, e.g., block 1106 and/or 1108, and/or one or more of the functions described below in relation to FIG. 12, including, e.g., block 1210, 1212, 1214, 1216, 1218, and/or 1220. The processor 604 may further include moving status determination circuitry 646 configured (e.g., in coordination with the memory 605) for various functions, including, for example, determining a moving status of the scheduled entity 600, e.g., based on a channel measurement, sensor data, or any other suitable parameters; and/or determining, based on the moving status, whether to report a wide beam or a narrow beam. For example, the moving status determination circuitry 646 may be configured to implement one or more of the functions described below in relation to FIG. 12, including, e.g., block 1208.

And further, the computer-readable medium 606 may store computer-executable code that includes communication instructions 660 that configure a scheduled entity 600 for various functions, including, e.g., transmitting uplink information and/or receiving downlink information. For example, the communication instructions 660 may be configured to cause a scheduled entity 600 to implement one or more of the functions described below in relation to FIG. 11, including, e.g., block 1108, and/or one or more of the functions described below in relation to FIG. 12, including, e.g., block 1202, 1210, 1220, and/or 1226. And further, the computer-readable medium 606 may store computer-executable code that includes channel characterization instructions 662 that configure a scheduled entity 600 for various functions, including, e.g., receiving a reference signal and determining channel characteristics based on the reference signal. For example, the channel characterization instructions 662 may be configured to cause a scheduled entity 600 to implement one or more of the functions described below in relation to FIG. 11, including, e.g., blocks 1102 and/or 1106, and/or one or more of the functions described below in relation to FIG. 12, including, e.g., block 1204, 1206, 1222, 1224, and/or 1226. And further, the computer-readable medium 606 may store computer-executable code that includes beam selection and identification instructions 664 that configure a scheduled entity 600 for various functions, including, e.g., selecting a DL beam (e.g., a wide beam) based on channel characteristics; selecting a direction corresponding to the selected beam; selecting an angular width of the selected beam to cover multiple narrow beams; indicating an angular width of a selected beam based on a horizontal component and a vertical component; and/or indicating an angular width of a selected beam based on a number of narrow beams the selected wide beam covers. For example, the beam selection and identification instructions 664 may be configured to cause a scheduled entity 600 to implement one or more of the functions described below in relation to FIG. 11, including, e.g., block 1106 and/or 1108, and/or one or more of the functions described below in relation to FIG. 12, including, e.g., block 1210, 1212, 1214, 1216, 1218, and/or 1220. And further, the computer-readable medium 606 may store computer-executable code that includes moving status determination instructions 666 that configure a scheduled entity 600 for various functions, including, e.g., determining a moving status of the scheduled entity 600, e.g., based on a channel measurement, sensor data, or any other suitable parameters; and/or determining, based on the moving status, whether to report a wide beam or a narrow beam. For example, the moving status determination instructions 666 may be configured to cause a scheduled entity 600 to implement one or more of the functions described below in relation to FIG. 12, including, e.g., block 1208.

In one configuration, the scheduled entity 600 for wireless communication includes means for transmitting and receiving information, means for receiving reference signals, means for determining channel characteristics, means for selecting a beam, means for selecting a direction, a horizontal parameter, a vertical parameter, and/or a number of beams for indicating a wide beam, and means for determining a moving status of the scheduled entity 600. In one aspect, the aforementioned means may be the processor 604 shown in FIG. 6 and/or the processor 734 shown in FIG. 7, configured to perform the functions recited by the aforementioned means. In another aspect, the aforementioned means may be a circuit or any apparatus configured to perform the functions recited by the aforementioned means.

Figure 9:
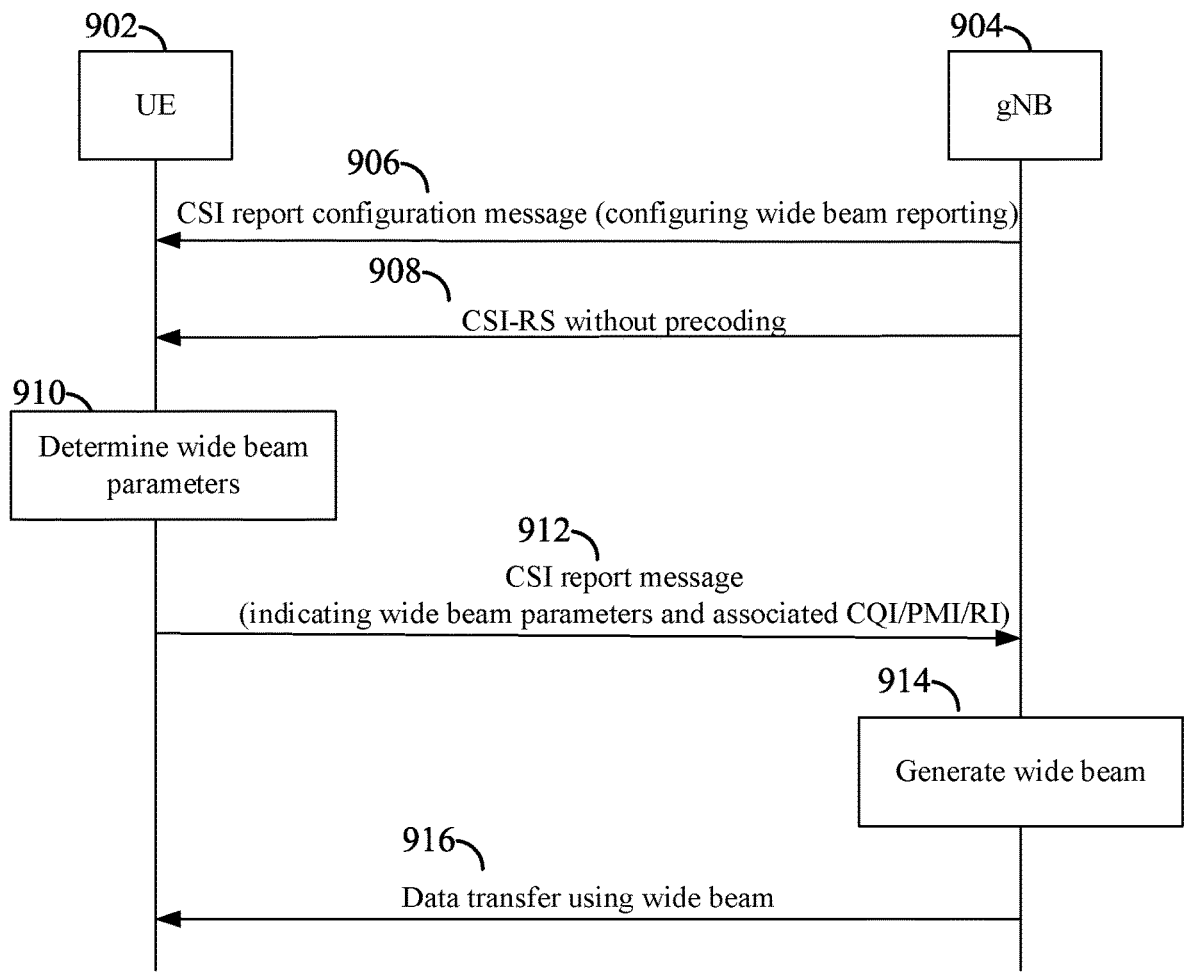
FIG. 9 is a call flow diagram illustrating an example of UE-assisted beam broadening with a one-step channel-state information (CSI) report according to some aspects.
Figure 10:
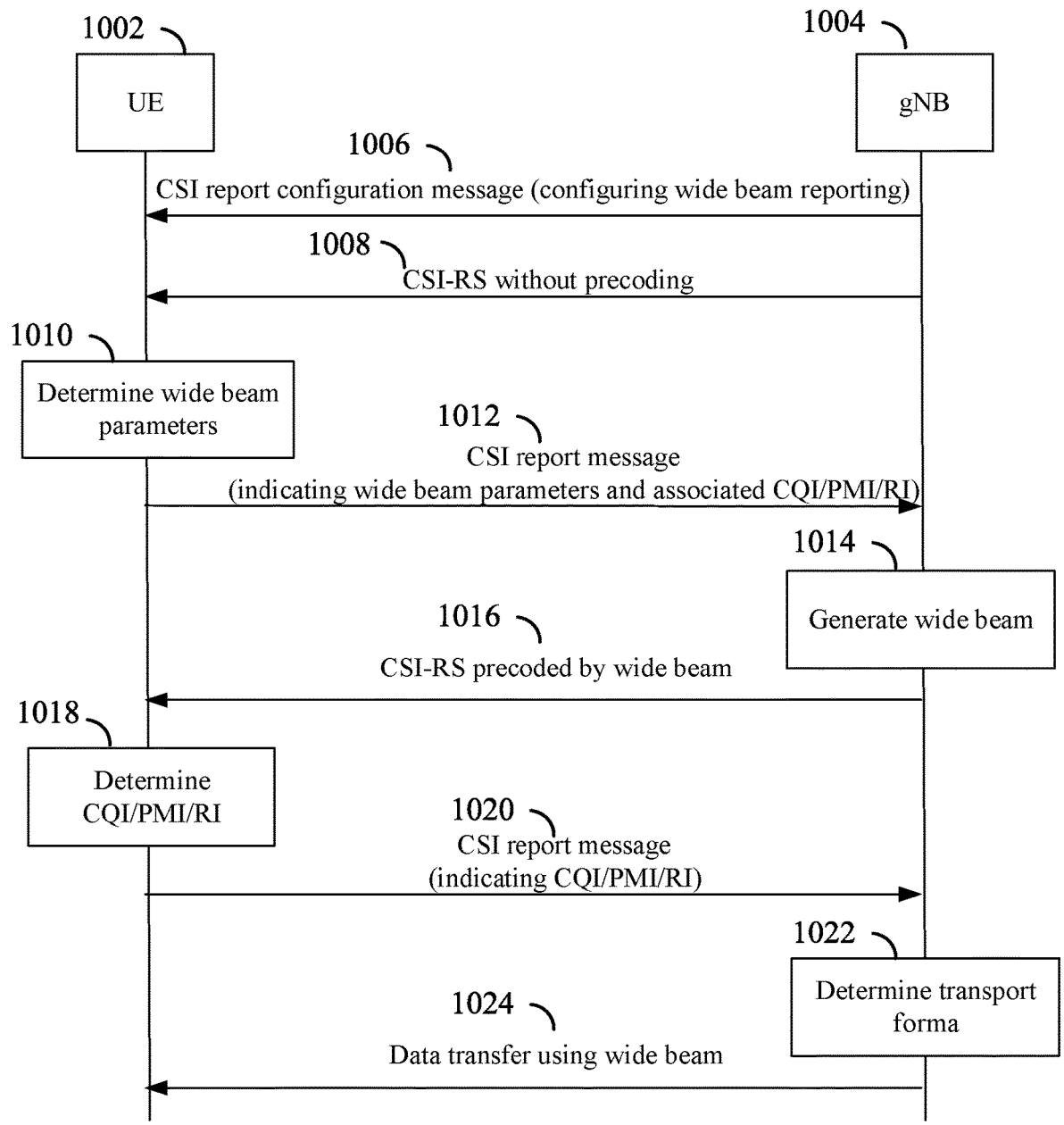
FIG. 10 is a call flow diagram illustrating an example of UE-assisted beam broadening with a two-step CSI report according to some aspects.
Figure 11:
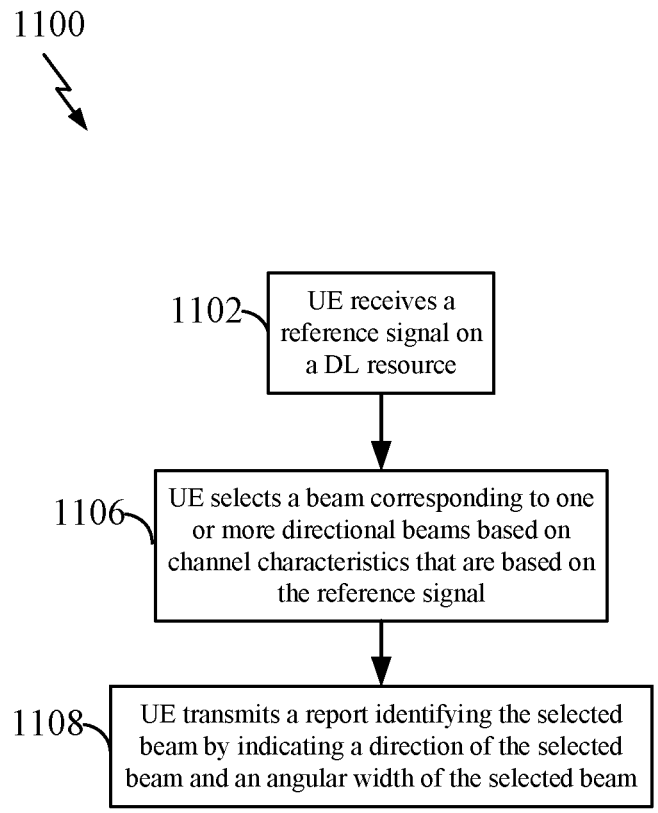
FIG. 11 is a flow chart illustrating an exemplary process for UE-assisted beam broadening according to some aspects of the disclosure.

Of course, in the above examples, the circuitry included in the processor 604 is merely provided as an example, and other means for carrying out the described functions may be included within various aspects of the present disclosure, including but not limited to the instructions stored in the computer-readable medium 606, or any other suitable apparatus or means described in any one of the FIGS. 1, 2, 3, 5, 7, 8, 9, and/or 10, and utilizing, for example, the processes and/or algorithms described herein in relation to FIGS. 9, 10, 11, and/or 12.

Figure 7:
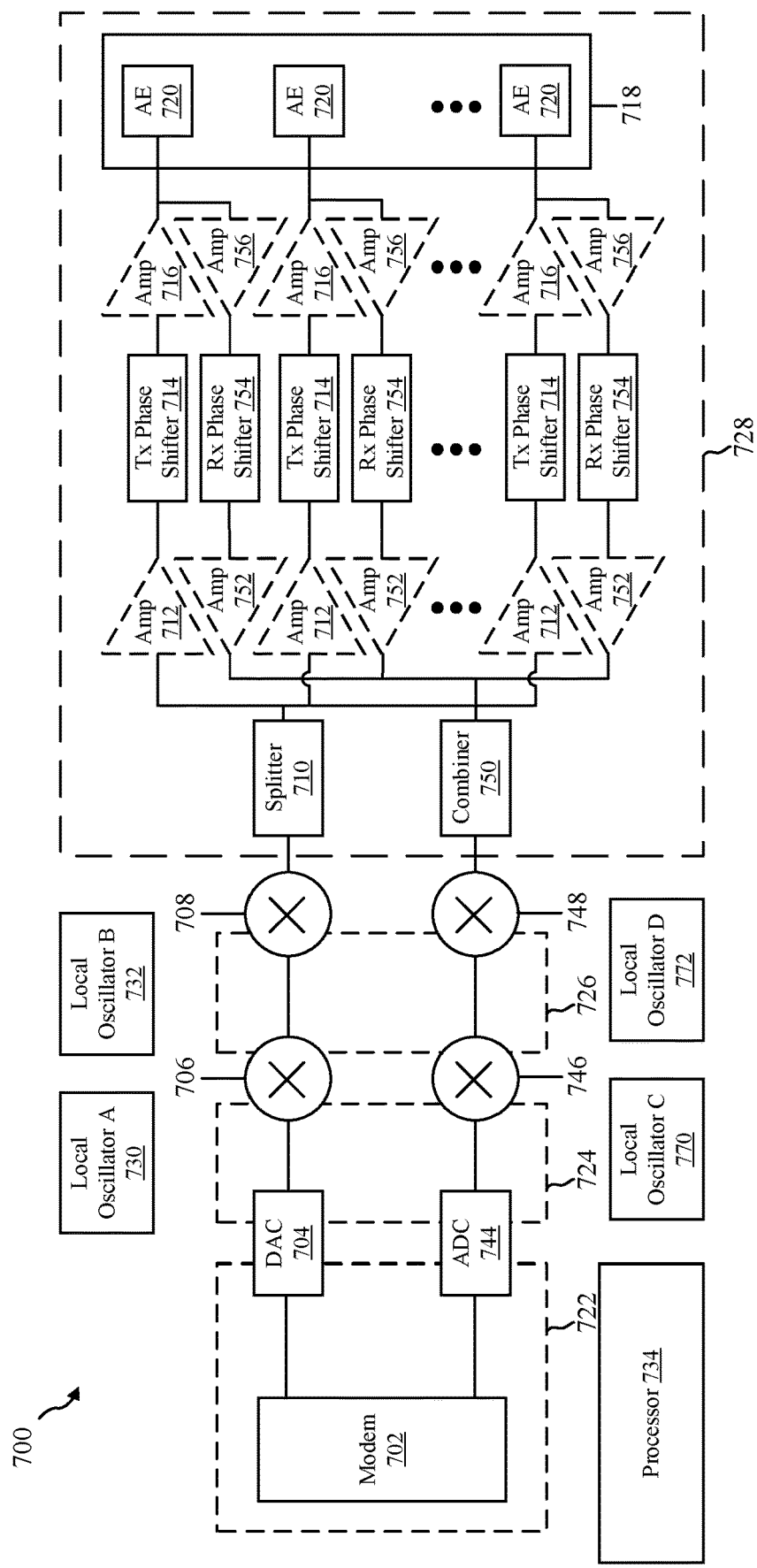
FIG. 7 is a block diagram conceptually illustrating an example of an architecture for an apparatus employing beamforming according to some aspects of the disclosure.
Figure 8:
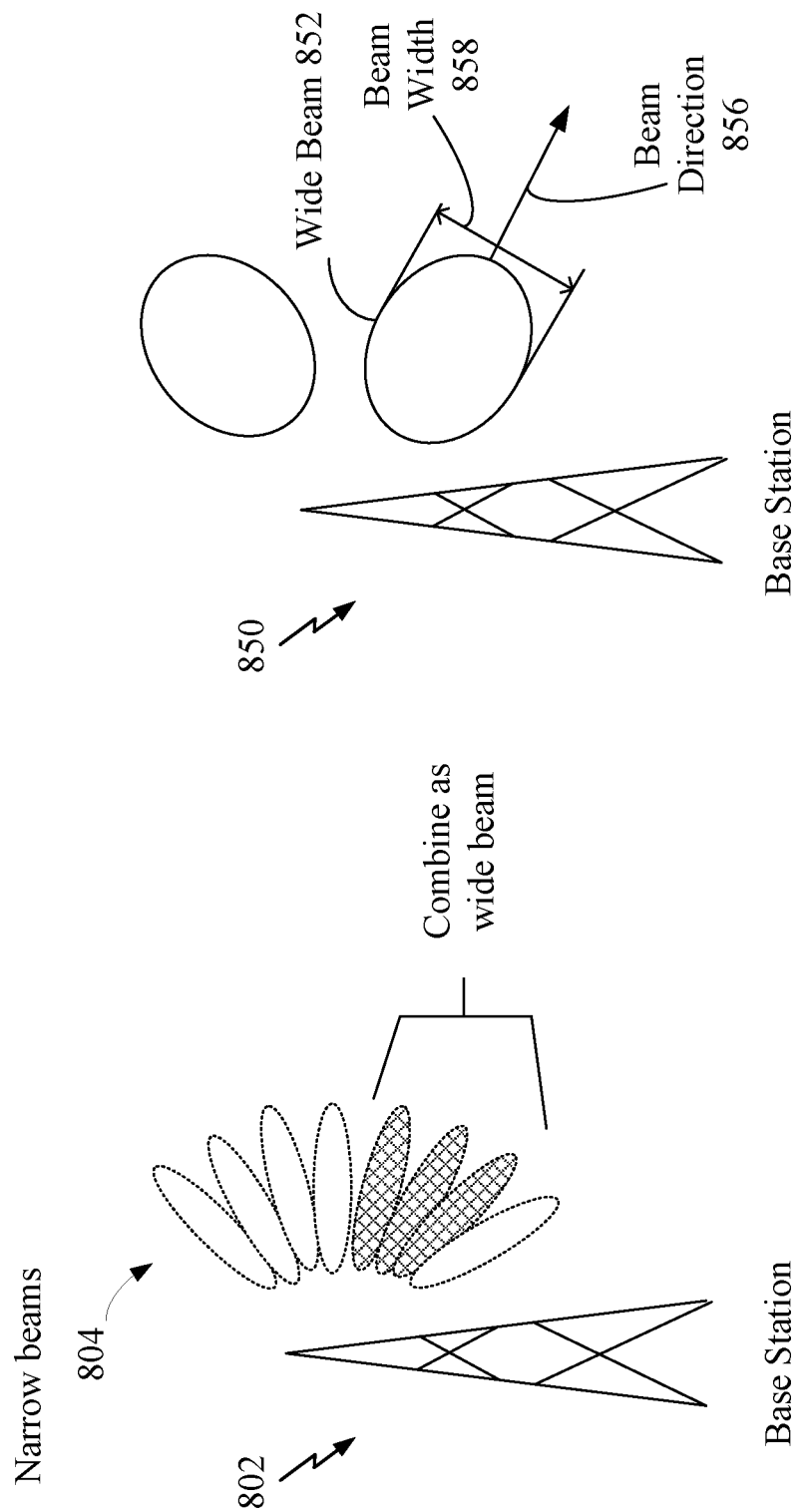
FIG. 8 is a schematic illustration of an example of user equipment (UE)-assisted beam broadening according to some aspects.

FIG. 7 illustrates an example of an architecture 700 that supports UE-assisted beam broadening in accordance with aspects of the present disclosure. In some examples, architecture 700 may implement aspects of wireless communication systems 100, 200, and/or 300. In some aspects, the architecture 700 may be an example of the transmitting device (e.g., a first wireless device, a scheduling entity 500, a scheduled entity 600, a UE, or a base station) and/or a receiving device (e.g., a second wireless device, a scheduling entity 500, a scheduled entity 600, UE, or base station) as described herein.

Broadly, FIG. 7 is a diagram illustrating example hardware components of a wireless device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 700 includes a modem (modulator/demodulator) 702, a digital to analog converter (DAC) 704, a first mixer 706, a second mixer 708, and a splitter 710. The architecture 700 also includes a plurality of first amplifiers 712, a plurality of phase shifters 714, a plurality of second amplifiers 716, and an antenna array 718 that includes a plurality of antenna elements 720. Transmission lines or other waveguides, wires, traces, or the like are shown connecting the various components to illustrate how signals to be transmitted may travel between components. Boxes 722, 724, 726, and 728 indicate regions in the architecture 700 in which different types of signals travel or are processed. Specifically, box 722 indicates a region in which digital baseband signals travel or are processed, box 724 indicates a region in which analog baseband signals travel or are processed, box 726 indicates a region in which analog intermediate frequency (IF) signals travel or are processed, and box 728 indicates a region in which analog radio frequency (RF) signals travel or are processed. The architecture also includes a local oscillator A 730, a local oscillator B 732, and a processor 734.

Each of the antenna elements 720 may include one or more sub-elements (not shown) for radiating or receiving RF signals. For example, a single antenna element 720 may include a first sub-element cross-polarized with a second sub-element that can be used to independently transmit cross-polarized signals. The antenna elements 720 may include patch antennas or other types of antennas arranged in a linear, two dimensional, or other pattern. A spacing between antenna elements 720 may be such that signals with a desired wavelength transmitted separately by the antenna elements 720 may interact or interfere (e.g., to form a desired beam). For example, given an expected range of wavelengths or frequencies, the spacing may provide a quarter wavelength, half wavelength, or other fraction of a wavelength of spacing between neighboring antenna elements 720 to allow for interaction or interference of signals transmitted by the separate antenna elements 720 within that expected range.

The modem 702 processes and generates digital baseband signals and may also control operation of the DAC 704, first and second mixers 706, 708, splitter 710, first amplifiers 712, phase shifters 714, and/or the second amplifiers 716 to transmit signals via one or more or all of the antenna elements 720. The modem 702 may process signals and control operation in accordance with a communication standard such as a wireless standard discussed herein. The DAC 704 may convert digital baseband signals received from the modem 702 (and that are to be transmitted) into analog baseband signals. The first mixer 706 upconverts analog baseband signals to analog IF signals within an IF using a local oscillator A 730. For example, the first mixer 706 may mix the signals with an oscillating signal generated by the local oscillator A 730 to "move" the baseband analog signals to the IF. In some cases some processing or filtering (not shown) may take place at the IF. The second mixer 708 upconverts the analog IF signals to analog RF signals using the local oscillator B 732. Similarly to the first mixer, the second mixer 708 may mix the signals with an oscillating signal generated by the local oscillator B 732 to "move" the IF analog signals to the RF, or the frequency at which signals will be transmitted or received. The modem 702 and/or the processor 734 may adjust the frequency of local oscillator A 730 and/or the local oscillator B 732 so that a desired IF and/or RF frequency is produced and used to facilitate processing and transmission of a signal within a desired bandwidth.

In the illustrated architecture 700, signals upconverted by the second mixer 708 are split or duplicated into multiple signals by the splitter 710. The splitter 710 in architecture 700 splits the RF signal into a plurality of identical or nearly identical RF signals, as denoted by its presence in box 728. In other examples, the split may take place with any type of signal including with baseband digital, baseband analog, or IF analog signals. Each of these signals may correspond to an antenna element 720 and the signal travels through and is processed by amplifiers 712, 716, phase shifters 714, and/or other elements corresponding to the respective antenna element 720 to be provided to and transmitted by the corresponding antenna element 720 of the antenna array 718. In one example, the splitter 710 may be an active splitter that is connected to a power supply and provides some gain so that RF signals exiting the splitter 710 are at a power level equal to or greater than the signal entering the splitter 710. In another example, the splitter 710 is a passive splitter that is not connected to power supply and the RF signals exiting the splitter 710 may be at a power level lower than the RF signal entering the splitter 710.

After being split by the splitter 710, the resulting RF signals may enter an amplifier, such as a first amplifier 712, or a phase shifter 714 corresponding to an antenna element 720. The first and second amplifiers 712, 716 are illustrated with dashed lines because one or both of them might not be necessary in some implementations. In one implementation, both the first amplifier 712 and second amplifier 716 are present. In another, neither the first amplifier 712 nor the second amplifier 716 is present. In other implementations, one of the two amplifiers 712, 716 is present but not the other. By way of example, if the splitter 710 is an active splitter, the first amplifier 712 may not be used. By way of further example, if the phase shifter 714 is an active phase shifter that can provide a gain, the second amplifier 716 might not be used. The amplifiers 712, 716 may provide a desired level of positive or negative gain. A positive gain (positive dB) may be used to increase an amplitude of a signal for radiation by a specific antenna element 720. A negative gain (negative dB) may be used to decrease an amplitude and/or suppress radiation of the signal by a specific antenna element. Each of the amplifiers 712, 716 may be controlled independently (e.g., by the modem 702 or processor 734) to provide independent control of the gain for each antenna element 720. For example, the modem 702 and/or the processor 734 may have at least one control line connected to each of the splitter 710, first amplifiers 712, phase shifters 714, and/or second amplifiers 716 which may be used to configure a gain to provide a desired amount of gain for each component and thus each antenna element 720.

The phase shifter 714 may provide a configurable phase shift or phase offset to a corresponding RF signal to be transmitted. The phase shifter 714 could be a passive phase shifter not directly connected to a power supply. Passive phase shifters might introduce some insertion loss. The second amplifier 716 could boost the signal to compensate for the insertion loss. The phase shifter 714 could be an active phase shifter connected to a power supply such that the active phase shifter provides some amount of gain or prevents insertion loss. The settings of each of the phase shifters 714 are independent meaning that each can be set to provide a desired amount of phase shift or the same amount of phase shift or some other configuration. The modem 702 and/or the processor 734 may have at least one control line connected to each of the phase shifters 714 and which may be used to configure the phase shifters 714 to provide a desired amounts of phase shift or phase offset between antenna elements 720.

In the illustrated architecture 700, RF signals received by the antenna elements 720 are provided to one or more of first amplifier 756 to boost the signal strength. The first amplifier 756 may be connected to the same antenna arrays 718, e.g., for TDD operations. The first amplifier 756 may be connected to different antenna arrays 718. The boosted RF signal is input into one or more of phase shifter 754 to provide a configurable phase shift or phase offset for the corresponding received RF signal. The phase shifter 754 may be an active phase shifter or a passive phase shifter. The settings of the phase shifters 754 are independent, meaning that each can be set to provide a desired amount of phase shift or the same amount of phase shift or some other configuration. The modem 702 and/or the processor 734 may have at least one control line connected to each of the phase shifters 754 and which may be used to configure the phase sifters 754 to provide a desired amount of phase shift or phase offset between antenna elements 720.

The outputs of the phase shifters 754 may be input to one or more second amplifiers 752 for signal amplification of the phase shifted received RF signals. The second amplifiers 752 may be individually configured to provide a configured amount of gain. The second amplifiers 752 may be individually configured to provide an amount of gain to ensure that the signal input to combiner 750 have the same magnitude. The amplifiers 752 and/or 756 are illustrated in dashed lines because they might not be necessary in some implementations. In one implementation, both the amplifier 752 and the amplifier 756 are present. In another, neither the amplifier 752 nor the amplifier 756 are present. In other implementations, one of the amplifiers 752, 756 is present but not the other.

In the illustrated architecture 700, signals output by the phase shifters 754 (via the amplifiers 752 when present) are combined in combiner 750. The combiner 750 in architecture combines the RF signal into a signal, as denoted by its presence in box 728. The combiner 750 may be a passive combiner, e.g., not connected to a power source, which may result in some insertion loss. The combiner 750 may be an active combiner, e.g., connected to a power source, which may result in some signal gain. When combiner 750 is an active combiner, it may provide a different (e.g., configurable) amount of gain for each input signal so that the input signals have the same magnitude when they are combined. When combiner 750 is an active combiner, it may not need the second amplifier 752 because the active combiner may provide the signal amplification.

The output of the combiner 750 is input into mixers 748 and 746. Mixers 748 and 746 generally down convert the received RF signal using inputs from local oscillators 772 and 770, respectively, to create intermediate or baseband signals that carry the encoded and modulated information. The output of the mixers 748 and 746 are input into an analog-to-digital converter (ADC) 744 for conversion to analog signals. The analog signals output from ADC 744 is input to modem 702 for baseband processing, e.g., decoding, de-interleaving, etc.

The architecture 700 is given by way of example only to illustrate an architecture for transmitting and/or receiving signals. It will be understood that the architecture 700 and/or each portion of the architecture 700 may be repeated multiple times within an architecture to accommodate or provide an arbitrary number of RF chains, antenna elements, and/or antenna panels. Furthermore, numerous alternate architectures are possible and contemplated. For example, although only a single antenna array 718 is shown, two, three, or more antenna arrays may be included each with one or more of their own corresponding amplifiers, phase shifters, splitters, mixers, DACs, ADCs, and/or modems. For example, a single UE may include two, four or more antenna arrays for transmitting or receiving signals at different physical locations on the UE or in different directions. Furthermore, mixers, splitters, amplifiers, phase shifters and other components may be located in different signal type areas (e.g., different ones of the boxes 722, 724, 726, 728) in different implemented architectures. For example, a split of the signal to be transmitted into a plurality of signals may take place at the analog RF, analog IF, analog baseband, or digital baseband frequencies in different examples. Similarly, amplification, and/or phase shifts may also take place at different frequencies. For example, in some contemplated implementations, one or more of the splitter 710, amplifiers 712, 716, or phase shifters 714 may be located between the DAC 704 and the first mixer 706 or between the first mixer 706 and the second mixer 708. In one example, the functions of one or more of the components may be combined into one component. For example, the phase shifters 714 may perform amplification to include or replace the first and/or or second amplifiers 712, 716. By way of another example, a phase shift may be implemented by the second mixer 708 to obviate the need for a separate phase shifter 714. This technique is sometimes called local oscillator (LO) phase shifting. In one implementation of this configuration, there may be a plurality of IF to RF mixers (e.g., for each antenna element chain) within the second mixer 708 and the local oscillator B 732 would supply different local oscillator signals (with different phase offsets) to each IF to RF mixer.

The modem 702 and/or the processor 734 may control one or more of the other components 704-772 to select one or more antenna elements 720 and/or to form beams for transmission of one or more signals. For example, the antenna elements 720 may be individually selected or deselected for transmission of a signal (or signals) by controlling an amplitude of one or more corresponding amplifiers, such as the first amplifiers 712 and/or the second amplifiers 716. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 720, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 718) can be dynamically controlled by modifying the phase shifts or phase offsets imparted by the phase shifters 714 and amplitudes imparted by the amplifiers 712, 716 of the plurality of signals relative to each other.

The processor 734 may, when architecture 700 is configured as a receiving device, transmit a first beam measurement report to a first wireless device, the first beam measurement report indicating a first set of beam measurements for a wireless channel between the first wireless device and the second wireless device. The processor 734 may receive from the first wireless device a cluster validity metric for at least one beam in the first beam measurement report. The processor 734 may transmit to the first wireless device a second beam measurement report based at least in part on the cluster validity metric, the second beam measurement report indicating a second set of beam measurements for the wireless channel, as discussed herein. The processor 734 may, when architecture 700 is configured as a transmitting device, receive a first beam measurement report from a second wireless device, the first beam measurement report indicating a first set of beam measurements for a wireless channel between the first wireless device and the second wireless device. The processor 734 may transmit to the second wireless device a cluster validity metric for at least one beam in the first beam measurement report. The processor 734 may receive from the second wireless device, in response to transmitting the cluster validity metric, a second beam measurement report indicating a second set of beam measurements for the wireless channel. The processor 734 may select a beam for transmitting to the second wireless device based at least in part on the first and second beam measurement reports, as discussed herein. The processor 734 may be located partially or fully within one or more other components of the architecture 700. For example, the processor 734 may be located within the modem 702 in at least one implementation.

In various aspects, the present disclosure provides for UE-assisted beam broadening with a reduced PMI report payload. In some examples, by employing aspects of the presently disclosed UE-assisted beam broadening, a wireless communication network may obtain the improved beamforming gain and performance provided with conventional beam broadening, without suffering from the same blow to spectrum efficiency and cell coverage that it causes.

In a time-varying channel, a wireless transmission signal may traverse a path from a transmitting node to a receiving node. For example, a DL signal may traverse a path from a gNB to a UE. In a multi-path propagation channel, this path may be considered as being made up of multiple subpaths. Here, a subpath corresponds to a cluster of adjacent scatters. Because the set of scatters in each cluster are adjacent to one another, they have similar angle of departure (AoD) values. In a time-variant channel, the most significant subpath may change over time. For example, in FIG. 8, base station 802 is shown transmitting a plurality of narrow DL beams 804, which may be generated using, for example, a type-1 codebook. The narrow DL beams 804 include a potential set of most significant subpaths over a given time for a given UE (not shown), which are highlighted beams 806. The UE may be a fast-moving UE, such as shown in FIGS. 4A-B. Therefore, according to an aspect of the present disclosure, for such time-variant channels, rather than applying a narrow beam corresponding to a single one of a given path's subpaths, a gNB 850 may provide a wide beam 852 that covers the directions of all the subpaths of a given path (e.g., that covers the directions of the beams 806). In this way, a gNB 850 can provide more reliable beamforming gain and more robust performance. The wide beam 852 has a beam direction 856 and a beam width 858.

For example, in an aspect of this disclosure, a UE may report a wide beam based on a direction and a corresponding beam width (e.g., angular width or angular span). Here, a UE may represent the beam direction by utilizing a codeword based on the legacy type-1 codebook described above, or any other suitable precoding codebook. And further, the UE may represent a beam width based on a number of indexes (e.g., corresponding to a set of contiguous or adjacent narrow beam indexes). For example, a UE may report wide beam parameters by indicating a number of narrow beams centered on an identified narrow beam. Thus, a UE may generate a PMI report indicating a wide beam that includes only a single codeword (or set of codewords corresponding to a single narrow beam).

In a further example, a UE may report such a beam direction and beam width for a plurality of wide beams. For example, a beam broadening procedure as set forth according to some aspects of this disclosure may employ beam broadening across a plurality of MIMO layers, with wide beam reporting information corresponding to each respective layer.

In some examples, a UE may provide a CSI report as disclosed herein utilizing a one-step CSI reporting procedure. Here, the UE may transmit a CSI report including wide beam parameters for a set of one or more beams, and further including CQI/PMI/RI information.

In other examples, a UE may provide a CSI report as disclosed herein utilizing a two-step CSI reporting procedure. Here, the UE may transmit a first CSI report including wide beam parameters for a set of one or more beams. Based on this report, a gNB may generate a wide beam and transmit a reference signal (e.g., CSI-RS) precoded by that wide beam. The UE may then determine and report, in a second CSI report, CQI/PMI/RI information based on the wide beam.

FIG. 9 is a call flow diagram illustrating an exemplary call flow for UE-assisted beam broadening in accordance with some aspects of the present disclosure. As described below, some or all illustrated features may be omitted in a particular implementation within the scope of the present disclosure, and some illustrated features may not be required for implementation of all embodiments. In various examples, the call flow may be carried out between the scheduling entity 500 illustrated in FIG. 5 and the scheduled entity 600 illustrated in FIG. 6. In some examples, the UE 902 may correspond to the scheduled entity 600 and the gNB 904 may correspond to the scheduling entity 500. And further, one or both of the UE 902 and/or the gNB 904 may include the circuitry and components of architecture 700.

As illustrated, it may be assumed that a wireless communication network has established a link between a UE 902 and a gNB 904 such that the respective entities are configured with a context enabling their intercommunication over a wireless air interface such as the RAN described above in FIGS. 1, 2, 3, 4A, and/or 4B. At any suitable time, the gNB 904 may transmit a CSI report configuration message 906 to the UE 902. With this message, the gNB 904 may configure the UE 902 to generate and transmit a CSI report based on UE-assisted beam broadening as disclosed herein.

In some examples, the gNB 904 may determine for a given UE 902 whether its CSI report should correspond to a narrow beam or a wide beam. For example, the gNB 904 may determine a moving status of the UE 902. A moving status may correspond to a selection between moving or stationary, and/or may be based on a speed or velocity of the UE 902. A gNB 904 may determine a UE's moving status in any suitable manner, including but not limited to receiving a UE report indicating its moving status, estimating the moving status of a UE based on a measurement of a suitable reference signal (e.g., SRS) that the UE transmits, etc. Accordingly, if the UE 902 has a determined moving status of slow-moving or stationary, the gNB 904 may configure the UE 902 to generate and transmit a CSI report corresponding to a narrow beam. And if the UE 902 has a determined moving status of fast moving (e.g., faster than a suitable threshold), the gNB 904 may configure the UE 902 to generate and transmit a CSI report corresponding to a wide beam, as discussed herein.

In other examples, a UE 902 may determine whether to transmit a CSI report corresponding to a narrow beam or a wide beam. For example, the UE 902 may determine its own moving status, as described above, and accordingly configure its CSI report. In such an example where a UE may decide between reporting narrow beam or wide beam parameters, the CSI report configuration message 906 may include an information element for enabling the UE 902 to implement this decision, and/or information to configure the UE' decision-making process.

Thus, in various examples, the gNB 904 may request the UE 902 to report a given number of beam directions and a respective angular width for each beam direction. The gNB 904 may provide this CSI report configuration message 906 in any suitable format and over any suitable channel. Some examples include the gNB 904 transmitting the CSI report configuration message 906 via RRC signaling, via a MAC-CE, via a DCI, or some combination of the above.

Based on the CSI report configuration message 906, and/or some other signaling or instruction, the UE 902 may monitor a set of DL resources for reference signals. According to an aspect of the present disclosure, the UE 902 may receive a reference signal 908 from the gNB 904. In some examples, the reference signal 908 may be a CSI-RS. In some examples, the reference signal 908 may be a CSI-RS without precoding, or a non-precoded CSI-RS. In some examples, the reference signal 908 may include a plurality of non-precoded CSI-RSs. For example, a multi-antenna gNB 904 configured for beamforming may transmit a non-precoded CSI-RS on a different resource from each respective antenna element. That is, the gNB 904 may transmit each such CSI-RS using only one antenna or antenna element. A UE 902 may accordingly be configured to receive and demultiplex such a set of CSI-RSs, and identify a gNB antenna corresponding to each CSI-RS. For example, the UE 902 may determine a correspondence between a given CSI-RS and an antenna based on an explicitly signaled antenna index, based on an implied antenna index corresponding to a transmission resource index each respective CSI-RS occupies, or in any other suitable manner.

At block 910, the UE 902 may determine or select a set of one or more beam directions, and the respective beams' angular widths, based on the reference signal 908. For example, for a selected beam, the UE 902 may determine suitable channel characteristics, such as a non-precoded channel matrix, based on the reference signal 908 (e.g., a set of non-precoded CSI-RSs). The UE 902 may further calculate parameters corresponding to a beam direction and width. For example, the UE 902 may determine or select a set or cluster of suitable, or best, narrow beams based on the non-precoded channel matrix. The UE 902 may accordingly select a codeword from a codebook that maps codewords to a set of narrow beams (or may select a subset of two or more codewords from a codebook that maps codewords to a set of narrow beams), the selected codeword (or subset of codewords) corresponding to one of the set or cluster of narrow beams (e.g., a central one of the set or cluster of narrow beams). The UE 902 may further determine the angular width of the selected beam based on the number of narrow beams in the selected set/cluster.

As described above, the UE 902 may carry out the process described here corresponding to block 910 to select any suitable number of beams corresponding to different MIMO layers.

The UE 902 may then generate and transmit a report (e.g., a CSI report message 912) identifying the selected beam or beams by indicating a direction and an angular width of each selected beam. Here, the CSI report message 912 may include at least one of a CQI, a PMI, and/or an RI. In some examples, e.g., where a UE 902 is configured to decide whether to report narrow beam parameters or wide beam parameters, e.g., based on its own moving status, the UE 902 may further transmit a flag or other suitable information element to indicate whether an associated CSI report message 912 indicates narrow beam parameters or wide beam parameters.

In some aspects, the UE 902 may report a wide beam in CSI report message 912 by providing a PMI that includes information identifying a codeword from a suitable narrow beam codebook. In some examples, the narrow beam codebook may correspond to a type-1 codebook, described above. Here, the selected codeword may represent, indicate, or correspond to the beam direction of the selected wide beam. Further, the PMI may include two beam width values corresponding to a horizontal beam component and a vertical beam component, respectively. For example, the vertical beam component may correspond to parameter $B_1$, and the horizontal beam component may correspond to the parameter $B_2$. Accordingly, a wide beam configured according to the CSI report message 912 may cover the codewords corresponding to vertical beam components {mod($i_1+b_1$, $N_1O_1$)}, and horizontal beam components {mod ($i_2+b_2$, $N_2O_2$)}, where $i_1$ is the beam index of the central narrow vertical beam (e.g., indicating its beam direction), $i_2$ is the beam index of the central narrow horizontal beam (e.g., indicating it beam direction), and where $b_1=\{-B_1, \ldots, B_1\}$, $b_2=\{-B_2, \ldots, B_2\}$. In this manner, by reporting beam direction and width values ($i_1$, $i_2$, $B_1$, $B_2$) the UE 902 can significantly reduce the payload of the CSI report message 912 compared to the reporting of the individual codeword indexes ($i_1-B_1, \ldots, i_1+B_1, i_2-B_2, \ldots, i_2+B_2$) (i.e., reporting all beams one by one).

A UE may indicate the beam direction of the selected wide beam in multiple ways. In some examples, as noted, a UE may use a selected codeword from a codebook (e.g., a type-1 codebook) to represent, indicate, or correspond to the direction of the selected wide beam. For example, $i_1$ and $i_2$ may represent the direction of the vertical beam component and the direction of the horizontal beam component, respectively, and each may be indicated by a codeword index of an oversampled discrete Fourier transform (DFT) matrix. For example, $i_1$ and $i_2$ may be indicated by the following equations (1) and (2):

$$i_1 = w_m = \left[1, e^{-j2\pi \frac{m}{O_1 N_1}}, e^{-j2\pi \frac{2m}{O_1 N_1}}, \ldots, e^{-j2\pi \frac{(N_1-1)m}{O_1 N_1}}\right] \quad (1)$$

$$i_2 = w_n = \left[1, e^{-j2\pi \frac{n}{O_2 N_2}}, e^{-j2\pi \frac{2n}{O_2 N_2}}, \ldots, e^{-j2\pi \frac{(N_2-1)n}{O_2 N_2}}\right] \quad (2)$$

where m=0, . . . , $O_1$, $N_1-1$, and where n=0, . . . , $O_2N_2-1$. In this option, the PMI report from the UE may include $\lceil \log_2(O_1N_1) \rceil$ bits to express $i_1$, and $\lceil \log_2(O_2N_2) \rceil$ bits to express $i_2$, where $N_1$, $N_2$, $O_1$, $O_2$ may be configured for the UE in advance.

In some examples, a direction of the selected wide beam may be expressed as a combination of a group of codewords from an oversampled DFT matrix (e.g., a subset of two or more codewords from a codebook). For example, $i_1$ and $i_2$ may be indicated by the following equations (3) and (4):

$$i_1 = \sum_{m=1}^{L_1} \alpha_m w_m \quad (3)$$

$$i_2 = \sum_{n=1}^{L_2} \beta_n w_n \quad (4)$$

where $w_m$ and $w_n$ are as defined in the preceding equations (1) and (2), $\alpha_m$ and $\beta_n$ are quantized with a certain number of bits (e.g., Q bits), $L_1$ represents the number of codewords combined to indicate the vertical direction, and $L_2$ represents the number of codewords combined to indicate the horizontal direction. In this option, the PMI report from the UE may include $\lceil \log_2(C_{N_1}^{L_1}) \rceil$ bits to express bits to express the selection of $L_1$ codewords indicating the direction of the vertical beam component; $\lceil \log_2(C_{N_2}^{L_2}) \rceil$ bits to express the selection of $L_2$ codewords indicating the direction of the horizontal beam component; and $Q(L_1+L_2)$ bits to express combining weights.

In a further aspect of this disclosure, the CSI report message 912 may include information identifying a plurality of wide beams, corresponding to a plurality of MIMO layers. Here, if the UE 902 reports wide beams for multiple layers, the UE 902 may report such a wide beam for each layer 1 by reporting each respective beam's direction values ($i_{1,l}$, $i_{2,l}$) and beam width values $B_{1,l}$ and $B_{2,l}$.

In the instances of identifying a plurality of wide beams corresponding to a plurality of MIMO layers, beam directions for the plurality of wide beams may be indicated in multiple ways. In some examples, each layer operates individually, and the direction of the wide beam for each layer is indicated without sharing identifying information across layers. For example, for each layer, the direction of the wide beam may be represented by $i_1$ and $i_2$ as defined by the above equations (1) and (2), respectively. In these examples, the PMI report from the UE may include $L \cdot (\lceil \log_2(O_1N_1) \rceil + \lceil \log_2(O_2N_2) \rceil)$ bits to indicate $i_1$ and $i_2$. Alternatively, for each layer, the direction of the wide beam may be represented by $i_1$ and $i_2$ as defined by the above equations (3) and (4), respectively. In these examples, the PMI report from the UE may include $$\sum_{l=1}^{L}\left(\lceil\log_2(C_{N_1}^{L_{l,1}})\rceil + \lceil\log_2(C_{N_2}^{L_{l,2}})\rceil + Q(L_{l,1}+L_{l,2})\right)$$

bits to indicate $i_1$ and $i_2$.

In other examples, multiple (L) layers operate jointly and the direction of the wide beam for each layer is indicated with shared identifying information across the L layers. For example, the direction of one wide beam for each layer of the L layers may be represented by the same values for $i_1$ and $i_2$ as defined by the above equations (3) and (4), respectively, Thus, the determined $i_1$ and $i_2$ values are shared by multiple layers. In these examples, the PMI report from the UE may include $$\lceil\log_2(C_{N_1}^{L_1})\rceil$$

bits to express the selection of $L_1$ codewords for the direction for the vertical beam component and $\lceil\log_2(C_{N_2}^{L_2})\rceil$ bits to express the selection of $L_2$ codewords for the direction of the horizontal beam component, respectively, and these selected codewords are usable for each of the L layers. Additionally, a set of combining weights for each selected codeword may be reported for each of the L layers as well, adding $LQ(L_1+L_2)$ bits to the PMI report to express combining weights.

Based on the CSI report message 912, at block 914 the gNB 904 may generate one or more beams (e.g., wide beam(s)). For example, the gNB 904 may determine a precoding matrix to apply to a transmission to the UE 902 based on the codeword(s) and angular width(s) in the CSI report message 912. In a further example, the gNB 904 may determine a precoding matrix corresponding to a narrow beam by applying a codeword in the CSI report message 912 to a precoding matrix index. The gNB 904 may further determine modified precoding matrix parameters for a wide beam based on an angular width in the CSI report message 912. For example, the gNB may determine a modified precoding matrix having a sufficient angular width to cover a number of narrow beam corresponding to a parameter in the CSI report message 912 that indicates the number of narrow beams.

The gNB 904 may then transmit DL data 916 to the UE 902 utilizing the generated beam(s) (e.g., one or more wide beams).

FIG. 10 is a call flow diagram illustrating an exemplary call flow for UE-assisted beam broadening in accordance with a further aspect of the present disclosure employing a two-step CSI report. As described below, some or all illustrated features may be omitted in a particular implementation within the scope of the present disclosure, and some illustrated features may not be required for implementation of all embodiments. In various examples, the call flow may be carried out between the scheduling entity 500 illustrated in FIG. 5 and the scheduled entity 600 illustrated in FIG. 6. In some examples, the UE 1002 may correspond to the scheduled entity 600 and the gNB 1004 may correspond to the scheduling entity 500. And further, one or both of the UE 1002 and/or the gNB 1004 may include the circuitry and components of architecture 700.

The call flow illustrated in FIG. 10 begins similar to the call flow described above and illustrated in FIG. 9. For example, a CSI report configuration message 1006, a CSI-RS 1008, and a UE determination 1010 of wide beam parameters may correspond to the messages/processes described above at FIG. 9, 906-910.

Here, the UE 1002 may transmit a CSI report message 1012, identifying the selected beam or beams by indicating a direction and an angular width of each selected beam, similar to the message/process described above in relation to CSI report message 912. In response, the gNB 1004 may configure a DL wide beam based on the CSI report message 1012, and may transmit one or more reference signals (e.g., CSI-RS) 1016 precoded to correspond to the reported wide beam. At block 1018, the UE 1002 may receive the reference signal 1016 and determine one or more suitable channel characteristics/parameters corresponding to the wide beam. Accordingly, the UE may transmit a second, or subsequent report (e.g., CSI report 1020) including CSI information such as a CQI, RI, and/or PMI, based on the received reference signals beamformed by the wide beam. With this CSI information, at block 1022 the gNB 1004 may determine one or more parameters for a DL transmission to the UE 1002 utilizing the wide beam. For example, the gNB 1004 may determine a transport format for a PDSCH transmission, e.g., including one or more of a number of layers, a precoding matrix, a modulation and coding scheme, etc. The gNB 1004 may then transmit a DL PDSCH 1024 utilizing the configured wide beam.

FIG. 11 is a flow chart illustrating an exemplary process 1100 for UE-assisted beam broadening in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduled entity 600 illustrated in FIG. 6, and or by the processor 734 and architecture 700 illustrated in FIG. 7. In some examples, the process 1100 may be carried out by any suitable apparatus or means for carrying out the functions or algorithm described below.

At block 1102, a UE may receive a reference signal on a DL resource. For example, a transceiver 610, which may employ the architecture 700, may monitor a set of DL resources for reference signals, and may receive a RS transmission from a base station or gNB. In some examples, the reference signal may be a CSI-RS. For example, as discussed with respect to FIGS. 9 and 10, a UE (e.g., the UE 902 or 1002) may receive a CSI-RS 908 or 1008 from a base station 904.

At block 1106, the UE may select a beam (e.g., a wide beam) corresponding to one or more directional beams (e.g., narrow beams), based on channel characteristics that are based on the reference signal. In some examples, a UE may determine a set of one or more channel characteristics based on the reference signal. For example, a channel characterization circuit 642 at a scheduled entity 600 may determine a set of one or more suitable channel characteristics, such as a non-precoded channel matrix, based on the received reference signal (e.g., a set of non-precoded CSI-RSs). For example, as discussed with respect to FIGS. 9 and 10, a UE (e.g., the UE 902 or 1002) may determine one or more channel characteristics based on a received CSI-RS as part of blocks 910 and 1010.

Then, a beam selection and identification circuit 644 at a scheduled entity 600 may determine or select a set of one or more beam directions, and the respective beams' angular widths, based on the determined set of one or more channel characteristics. For example, a UE may determine or select a set or cluster of suitable, or best, narrow beams based on the non-precoded channel matrix. The UE may accordingly select a codeword from a codebook that maps codewords to a set of narrow beams, the selected codeword corresponding to one of the set or cluster of narrow beams (e.g., a central one of the set or cluster of narrow beams). In some example, the UE may select multiple codewords from a codebook that maps codewords to a set of narrow beams, the combination of the selected codewords corresponding to a combination of the set or cluster of narrow beams (e.g., and representing a direction resulting from the combination of the set or cluster of narrow beams). The UE may further determine the angular width of the selected beam based on the number of narrow beams in the selected set/cluster.

In some examples, in block 1106, the UE (e.g., the beam selection and identification circuit 644) may identify the selected (wide) beam in terms of a direction component and an angular width component, such as described above with respect to blocks 910 and 1010 of FIGS. 9 and 10. As described above with respect to blocks 910 and 1010 of FIGS. 9 and 10, the direction component may be indicated in multiple ways. For example, the direction component may be indicated based on a codeword from a codebook (e.g., Type-1 codebook) having a vertical beam component ($i_1$) and a horizontal beam component ($i_2$). In these examples, the components $i_1$ and $i_2$ may be defined by the equations (1) and (2) described above. In some examples, the direction component of the selected (wide) beam is indicated by a combination of multiple codewords from a codebook (e.g., a Type-2 codebook), and the combination of multiple codewords have a vertical beam component ($i_1$) and a horizontal beam component ($i_2$). In these examples, the components $i_1$ and $i_2$ may be defined by the equations (3) and (4) described above. As also described above, the angular width component may be indicated by beam width value $B_1$ and $B_2$, where beam width value $B_1$ is for the vertical beam component and beam width value $B_2$ is for the horizontal beam component.

At block 1108, the UE may transmit a report (e.g., a CSI report) identifying the selected beam by indicating a direction of the selected beam and an angular width of the selected beam. For example, a transceiver 610 at a scheduled entity 600 may transmit an UL message including a suitable report. Here, the CSI report message may include at least one of a CQI, a PMI, and/or an RI. In some examples, the direction may be indicated by directional components $i_1$ and $i_2$ and the angular width may be indicated by the beam width values $B_1$ and $B_2$.

Figure 12:
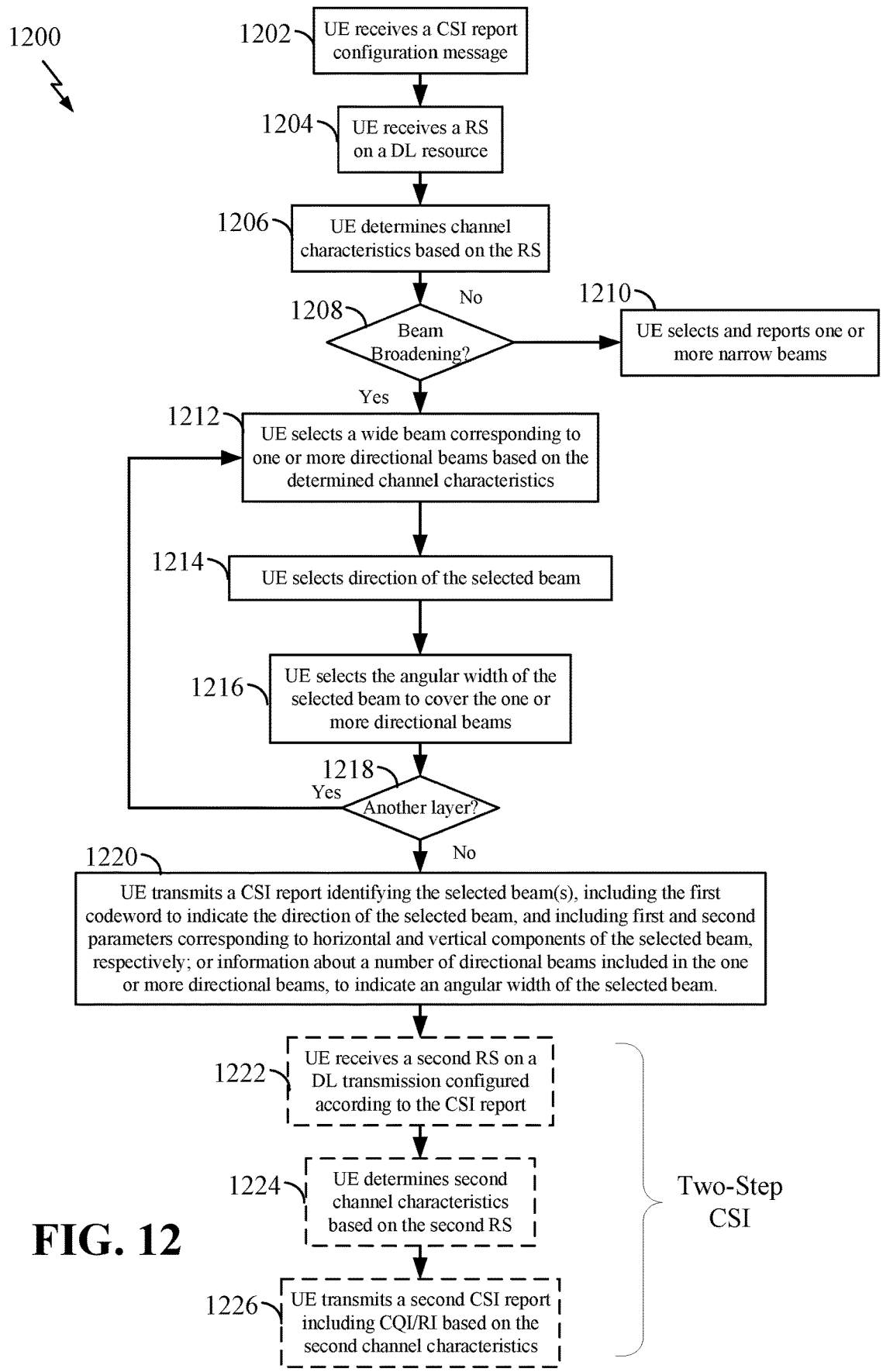
FIG. 12 is a flow chart illustrating another exemplary process for UE-assisted beam broadening according to some aspects of the disclosure.

FIG. 12 is a flow chart illustrating an exemplary process 1200 for UE-assisted beam broadening in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduled entity 600 illustrated in FIG. 6, and or by the processor 734 and architecture 700 illustrated in FIG. 7. In some examples, the process 1200 may be carried out by any suitable apparatus or means for carrying out the functions or algorithm described below.

At block 1202, a UE may receive a CSI report configuration message, which may include information to configure the UE to generate and transmit a CSI report based on UE-assisted beam broadening as disclosed herein. For example, a transceiver 610 at a scheduled entity 600 may receive a DL message including CSI report configuration information. With this message, a gNB may configure a UE to generate and transmit a CSI report based on UE-assisted beam broadening as disclosed herein.

At block 1204, a UE may monitor a set of DL resources for reference signals, and accordingly, may receive a reference signal on a monitored DL resource. For example, a transceiver 610, which may employ the architecture 700, may monitor a set of DL resources for reference signals, and may receive a RS transmission from a base station or gNB. In some examples, the reference signal may be a CSI-RS. For example, as discussed with respect to FIGS. 9 and 10, a UE (e.g., the UE 902 or 1002) may receive a CSI-RS 908 and 1008 from a base station 904.

At block 1206, a UE may determine suitable channel characteristics, such as a non-precoded channel matrix, based on the reference signal. For example, a channel characterization circuit 642 at a scheduled entity 600 may determine a set of one or more suitable channel characteristics, such as a non-precoded channel matrix, based on the received reference signal (e.g., a set of non-precoded CSI-RSs). For example, as discussed with respect to FIGS. 9 and 10, a UE (e.g., the UE 902 or 1002) may determine one or more channel characteristics based on a received CSI-RS as part of blocks 910 and 1010.

At block 1208, a UE may determine whether to employ beam broadening in accordance with various aspects of the present disclosure. Here, in some examples, a processor 604 at a scheduled entity 600 may determine whether to employ beam broadening in accordance with an instruction received from a base station or gNB, e.g., in a CSI report configuration message received at block 1202. In other examples, a moving status determination circuit 646 at a scheduled entity 600 may determine whether to employ beam broadening in accordance with a moving status of the UE. In any case, if the UE determines not to employ beam broadening, then the process may proceed to block 1210. Here, the UE may select and report one or more narrow beams based on the channel characteristics.

At block 1212, a UE may select a wide beam corresponding to one or more directional beams (e.g., narrow beams) based on the determined channel characteristics. For example, the UE may determine or select a set or cluster of suitable, or best, narrow beams based on a non-precoded channel matrix. For example, a beam selection and identification circuit 644 at a scheduled entity 600 may determine or select a set of one or more beam directions, and the respective beams' angular widths, based on the determined set of one or more channel characteristics. For example, a UE may determine or select a set or cluster of suitable, or best, narrow beams based on the non-precoded channel matrix.

At block 1214, a UE may determine or select a direction component for the wide beam. For example, as described above with respect to blocks 910 and 1010 of FIGS. 9 and 10, the direction component of the wide beam may be indicated in multiple ways. For example, the direction component may be indicated based on a codeword from a codebook (e.g., Type-1 codebook) having a vertical beam component ($i_1$) and a horizontal beam component ($i_2$). The UE may select the codeword (a first codeword) corresponding to the selected (wide) beam from a codebook that maps codewords to narrow beams. Here, a beam selection and identification circuit 644 at a scheduled entity 600 may select a codeword corresponding to one of the set or cluster of narrow beams (e.g., a central one of the set or cluster of narrow beams). In some examples, the narrow beam codebook may correspond to a type-1 codebook, described above. Here, the selected codeword may represent, indicate, or correspond to the beam direction of the selected wide beam. In these examples, the beam selection and identification circuit 644 may determine the components $i_1$ and $i_2$ using the equations (1) and (2) described above.

In some examples, the direction component of the selected (wide) beam is indicated by a combination of multiple codewords from a codebook (e.g., a Type-2 codebook), and the combination of multiple codewords have a vertical beam component ($i_1$) and a horizontal beam component ($i_2$). Here, a beam selection and identification circuit 644 at a scheduled entity 600 may select the codewords corresponding to the set or cluster of narrow beams and combine the codewords. In these examples, the beam selection and identification circuit 644 may determine the components $i_1$ and $i_2$ using the equations (3) and (4) described above.

At block 1216, a UE may determine or select an angular width of the selected beam to cover the one or more directional beams (e.g., narrow beams) (e.g., based on the number of narrow beams in the selected set/cluster). Here, a beam selection and identification circuit 644 at a scheduled entity 600 may determine or select a set or cluster of suitable, or best, narrow beams based on the non-precoded channel matrix. The UE may further determine the angular width of the selected beam based on the number of narrow beams in the selected set/cluster. In some examples, the UE may determine two beam width values (e.g., $B_1$ and $B_2$) corresponding to a horizontal beam component and a vertical beam component, respectively.

At block 1218, a UE may determine whether to select beams for another MIMO layer. That is, the UE may carry out the process described here corresponding to blocks 1212, 1214, and 1216 to select any suitable number of beams corresponding to different MIMO layers (e.g., for L layers).

At block 1220, a UE may generate and transmit a CSI report identifying the selected beam(s). For example, a transceiver 610 at a scheduled entity 600 may transmit an UL message including a suitable report. Here, the CSI report may include a codeword to indicate the direction of each selected beam. In the case of the beam direction being indicated by a combination of multiple codewords, the CSI report may include $L_1$ codewords to indicate the vertical beam component and $L_2$ codewords to indicate the horizontal beam component. Additionally, to indicate an angular width of the selected beam(s), the CSI report may further include first and second parameters corresponding to horizontal and vertical components of each of the selected beam(s), respectively; or information about a number of directional beams included in the one or more directional beams for each of the selected (wide) beam(s). In some examples, the CSI report may further include at least one of a CQI, a PMI, and/or an RI. In some examples, each of the selected (wide) beams may be identified in the CSI report by directional components $i_1$ and $i_2$ (e.g., as defined by equations (1) and (2) or by equations (3) and (4)) and the angular width may be indicated by the beam width values $B_1$ and $B_2$. In some examples (e.g., where the UE is configured to select between wide and narrow beams based on a UE moving status), the CSI report may further include an indication of whether the selected beam is a wide beam or a narrow beam.

Blocks 1222, 1224, and 1226 are optional, and correspond to an example employing a two-step CSI report, e.g., as described above and illustrated in FIG. 10. At block 1222, a UE may receive a second reference signal on a DL transmission configured according to the CSI report of block 1220. For example, a transceiver 610, which may employ the architecture 700, may monitor a set of DL resources for reference signals, and may receive a RS transmission from a base station or gNB. In some examples, the second reference signal may be a CSI-RS.

At block 1224, a UE may determine second channel characteristics and/or channel parameters based on the second reference signal. For example, a channel characterization circuit 642 at a scheduled entity 600 may determine a set of one or more suitable channel characteristics, such as a channel matrix, based on the received reference signal (e.g., a set of CSI-RSs).

And at block 1226, a UE may transmit a second CSI report including one or more of a CQI, a PMI, and/or an RI based on the second channel characteristics. For example, a transceiver 610 at a scheduled entity 600 may transmit an UL message including a suitable report. In some examples, the second CSI report may include at least one of a CQI, a PMI, and/or an RI.

FURTHER EXAMPLES HAVING A VARIETY OF FEATURES

Example 1: A method, apparatus, and non-transitory computer-readable medium for UE operation in a cell that utilizes downlink beamforming comprising a plurality of directional beams. A UE receives a first reference signal on a downlink resource. The UE selects a beam corresponding to one or more directional beams of the plurality of directional beams based on a set of one or more channel characteristics that are based on the reference signal. The UE further transmits a report identifying the selected beam by indicating a direction of the selected beam and an angular width of the selected beam.

Example 2: A method, apparatus, and non-transitory computer-readable medium of Example 1, where the UE further selects a first codeword, corresponding to the selected beam, from a codebook that maps a plurality of codewords to the plurality of directional beams. The UE indicates the direction of the selected beam by including the first codeword in the transmitted report.

Example 3: A method, apparatus, and non-transitory computer-readable medium of Example 1, where the UE further selects a subset of two or more codewords, corresponding to the selected beam, from a codebook that maps a plurality of codewords to the plurality of directional beams. The UE indicates the direction of the selected beam by expressing the direction as a combination of the subset of two or more codewords in the transmitted report.

Example 4: A method, apparatus, and non-transitory computer-readable medium of any of Examples 1 to 3, where the UE further selects the angular width of the selected beam to cover the one or more directional beams of the plurality of directional beams. The UE indicates the angular width of the selected beam by at elast one selected from the group of (i) including a first parameter corresponding to a horizontal component of the selected beam and a second parameter corresponding to a vertical component of the selected beam in the transmitted report, and (ii) indicating the angular width of the selected beam by indicating information about a number of directional beams included in the one or more directional beams.

Example 5: A method, apparatus, and non-transitory computer-readable medium of any of Examples 1 to 4, where the UE further selects a plurality of wide beams, including the selected beam, corresponding to a plurality of layers. Here, the report further identifies the selected plurality of wide beams by indicating a respective direction and a respective angular width of respective beams of the plurality of wide beams.

Example 6: A method, apparatus, and non-transitory computer-readable medium of any of Examples 1 to 5, where the UE receives a second reference signal on a downlink transmission configured according to the transmitted report. The UE transmits a second report including at least one of a channel quality indicator (CQI), a precoding matrix indicator (PMI), or a rank indicator (RI) based on a second set of one or more channel characteristics that are based on the second reference signal.

Example 7: A method, apparatus, and non-transitory computer-readable medium of any of Examples 1 to 6, where the UE receives a report configuration message including information indicating whether the transmitted report should include one or more of: a wide beam corresponding to one or more directional beams, or a narrow beam corresponding to a selected directional beam of the plurality of directional beams.

Example 8: A method, apparatus, and non-transitory computer-readable medium of any of Examples 1 to 7, where the UE determines, based on a moving status of the UE, whether the transmitted report should include one or more of: a wide beam corresponding to one or more directional beams, or a narrow beam corresponding to a selected directional beam of the plurality of directional beams.

Example 9: A method, apparatus, and non-transitory computer-readable medium of any of Examples 1 to 8, where the report includes an indication whether the selected beam is a wide beam corresponding to one or more directional beams, or a narrow beam corresponding to a selected directional beam of the plurality of directional beams.

Example 10: A method, apparatus, and non-transitory computer-readable medium of any of Examples 1 to 9, where the report further includes at least one of a channel quality indicator (CQI), a precoding matrix indicator (PMI), or a rank indicator (RI).

This disclosure presents several aspects of a wireless communication network with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The present disclosure uses the term "coupled" to refer to a direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Applicant provides this description to enable any person skilled in the art to practice the various aspects described herein. Those skilled in the art will readily recognize various modifications to these aspects, and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication operable at a user equipment (UE) configured for operation in a cell configured for downlink beamforming over a plurality of directional beams, the method comprising:
    receiving a first reference signal on a downlink resource;
    selecting a beam corresponding to one or more directional beams of the plurality of directional beams, based on a set of one or more channel characteristics that are based on the first reference signal; and
    transmitting a report identifying the selected beam, including indicating a direction of the selected beam and indicating an angular width of the selected beam, wherein the direction of the selected beam is indicated based on a codeword from a codebook that maps a plurality of codewords to the plurality of directional beams and wherein the codeword corresponds to a vertical beam component of the selected beam and a horizontal beam component of the selected beam.

2. The method of claim 1, further comprising:
    selecting a first codeword, corresponding to the selected beam, from the codebook that maps a plurality of codewords to the plurality of directional beams; and
    including the first codeword in the transmitted report to indicate the direction of the selected beam.

3. The method of claim 1, further comprising:
    selecting a subset of two or more codewords, corresponding to the selected beam, from the codebook that maps a plurality of codewords to the plurality of directional beams, and
    indicating the direction of the selected beam, including expressing the direction as a combination of the subset of two or more codewords in the transmitted report.

4. The method of claim 1, further comprising:
    selecting the angular width of the selected beam to cover the one or more directional beams of the plurality of directional beams; and
    indicating the angular width of the selected beam by at least one selected from a group of:

including a first parameter corresponding to the horizontal component of the selected beam and a second parameter corresponding to the vertical component of the selected beam in the transmitted report, and indicating the angular width of the selected beam, including indicating information about a number of directional beams included in the one or more directional beams.

5. The method of claim 1, further comprising:
selecting a plurality of wide beams, including the selected beam, corresponding to a plurality of layers,
wherein the report further identifies the selected plurality of wide beams, including indicating a respective direction and a respective angular width of respective beams of the plurality of wide beams.

6. The method of claim 1, further comprising:
receiving a second reference signal on a downlink transmission configured according to the transmitted report; and
transmitting a second report comprising at least one of a channel quality indicator (CQI), a precoding matrix indicator (PMI), or a rank indicator (RI) based on a second set of one or more channel characteristics that are based on the second reference signal.

7. The method of claim 1, further comprising:
receiving a report configuration message comprising information indicating whether the transmitted report should include one or more of:
a wide beam corresponding to one or more directional beams; or
a narrow beam corresponding to a selected directional beam of the plurality of directional beams.

8. The method of claim 1, further comprising:
determining, based on a moving status of the UE, whether the transmitted report should include one or more of:
a wide beam corresponding to one or more directional beams; or
a narrow beam corresponding to a selected directional beam of the plurality of directional beams.

9. The method of claim 1, wherein the report comprises an indication whether the selected beam is a wide beam corresponding to one or more directional beams, or a narrow beam corresponding to a selected directional beam of the plurality of directional beams.

10. A user equipment (UE) configured for wireless communication in a cell configured for downlink beamforming over a plurality of directional beams, the UE comprising:
means for receiving a first reference signal on a downlink resource;
means for selecting a beam corresponding to one or more directional beams of the plurality of directional beams, based on a set of one or more channel characteristics that are based on the first reference signal; and
means for transmitting a report identifying the selected beam, including indicating a direction of the selected beam and indicating an angular width of the selected beam, wherein the direction of the selected beam is indicated based on a codeword from a codebook that maps a plurality of codewords to the plurality of directional beams and wherein the codeword corresponds to a vertical beam component of the selected beam and a horizontal beam component of the selected beam.

11. The UE of claim 10, further comprising:
means for selecting a first codeword, corresponding to the selected beam, from the codebook that maps a plurality of codewords to the plurality of directional beams; and
means for including the first codeword in the transmitted report to indicate the direction of the selected beam.

12. The UE of claim 10, further comprising:
means for selecting a subset of two or more codewords, corresponding to the selected beam, from the codebook that maps a plurality of codewords to the plurality of directional beams; and
means for indicating the direction of the selected beam, including expressing the direction as a combination of the subset of two or more codewords in the transmitted report.

13. The UE of claim 10, further comprising:
means for selecting the angular width of the selected beam to cover the one or more directional beams of the plurality of directional beams; and
means for indicating the angular width of the selected beam by at least one selected from a group of:
including a first parameter corresponding to the horizontal component of the selected beam and a second parameter corresponding to the vertical component of the selected beam in the transmitted report, and
indicating information about a number of directional beams included in the one or more directional beams.

14. The UE of claim 10, further comprising:
means for selecting a plurality of wide beams, including the selected beam, corresponding to a plurality of layers,
wherein the report further identifies the selected plurality of wide beams, including indicating a respective direction and a respective angular width of respective beams of the plurality of wide beams.

15. The UE of claim 10, further comprising:
means for receiving a second reference signal on a downlink transmission configured according to the transmitted report; and
means for transmitting a second report comprising at least one of a channel quality indicator (CQI), a precoding matrix indicator (PMI), or a rank indicator (RI) based on a second set of one or more channel characteristics that are based on the second reference signal.

16. A non-transitory computer-readable medium storing computer-executable code, operable at a user equipment (UE) configured for operation in a cell configured for downlink beamforming over a plurality of directional beams, comprising code for causing the UE to:
receive a first reference signal on a downlink resource;
select a beam corresponding to one or more directional beams of the plurality of directional beams, based on a set of one or more channel characteristics that are based on the first reference signal; and
transmit a report identifying the selected beam, including indicating a direction of the selected beam and indicating an angular width of the selected beam, wherein the direction of the selected beam is indicated based on a codeword from a codebook that maps a plurality of codewords to the plurality of directional beams and wherein the codeword corresponds to a vertical beam component of the selected beam and a horizontal beam component of the selected beam.

17. The non-transitory computer-readable medium of claim 16, wherein the computer-executable code further comprises code for causing the UE to:
select a first codeword, corresponding to the selected beam, from the codebook that maps a plurality of codewords to the plurality of directional beams; and include the first codeword in the transmitted report to indicate the direction of the selected beam.

18. The non-transitory computer-readable medium of claim 16, wherein the computer-executable code further comprises code for causing the UE to:
select a subset of two or more codewords, corresponding to the selected beam, from the codebook that maps a plurality of codewords to the plurality of directional beams; and
indicate the direction of the selected beam, including expressing the direction as a combination of the subset of two or more codewords in the transmitted report.

19. The non-transitory computer-readable medium of claim 16, wherein the computer-executable code further comprises code for causing the UE to:
select the angular width of the selected beam to cover the one or more directional beams of the plurality of directional beams; and
indicate the angular width of the selected beam by at least one selected from a group of:
including a first parameter corresponding to the horizontal component of the selected beam and a second parameter corresponding to the vertical component of the selected beam in the transmitted report, and
indicating information about a number of directional beams included in the one or more directional beams.

20. The non-transitory computer-readable medium of claim 16, wherein the computer-executable code further comprises code for causing the UE to:
select a plurality of wide beams, including the selected beam, corresponding to a plurality of layers,
wherein the report further identifies the selected plurality of wide beams, including indicating a respective direction and a respective angular width of respective beams of the plurality of wide beams.

21. The non-transitory computer-readable medium of claim 16, wherein the computer-executable code further comprises code for causing the UE to:
receive a second reference signal on a downlink transmission configured according to the transmitted report; and
transmit a second report comprising at least one of a channel quality indicator (CQI), a precoding matrix indicator (PMI), or a rank indicator (RI) based on a second set of one or more channel characteristics that are based on the second reference signal.

22. A user equipment (UE) configured for wireless communication in a cell configured for downlink beamforming over a plurality of directional beams, the UE comprising:
a processor;
a transceiver communicatively coupled to the processor; and
a memory communicatively coupled to the processor,
wherein the processor and the memory are configured to:
receive, via the transceiver, a first reference signal on a downlink resource;
select a beam corresponding to one or more directional beams of the plurality of directional beams based on a set of one or more channel characteristics that are based on the first reference signal; and
transmit, via the transceiver, a report identifying the selected beam, including indicating a direction of the selected beam and indicating an angular width of the selected beam, wherein the direction of the selected beam is indicated based on a codeword from a codebook that maps a plurality of codewords to the plurality of directional beams and wherein the codeword corresponds to a vertical beam component of the selected beam and a horizontal beam component of the selected beam.

23. The UE of claim 22, wherein the processor and the memory are further configured to:
select a first codeword, corresponding to the selected beam, from the codebook that maps a plurality of codewords to the plurality of directional beams; and
include the first codeword in the transmitted report to indicate the direction of the selected beam.

24. The UE of claim 22, wherein the processor and the memory are further configured to:
select a subset of two or more codewords, corresponding to the selected beam, from the codebook that maps a plurality of codewords to the plurality of directional beams; and
indicate the direction of the selected beam, including expressing the direction as a combination of the subset of two or more codewords in the transmitted report.

25. The UE of claim 22, wherein the processor and the memory are further configured to:
select the angular width of the selected beam to cover the one or more directional beams of the plurality of directional beams; and
indicate the angular width of the selected beam by at least one selected from a group of:
including a first parameter corresponding to the horizontal component of the selected beam and a second parameter corresponding to the vertical component of the selected beam in the transmitted report, and
indicating information about a number of directional beams included in the one or more directional beams.

26. The UE of claim 22, wherein the processor and the memory are further configured to:
select a plurality of wide beams, including the selected beam, corresponding to a plurality of layers,
wherein the report further identifies the selected plurality of wide beams, including indicating a respective direction and a respective angular width of respective beams of the plurality of wide beams.

27. The UE of claim 22, wherein the processor and the memory are further configured to:
receive, via the transceiver, a second reference signal on a downlink transmission configured according to the transmitted report; and
transmit, via the transceiver, a second report comprising at least one of a channel quality indicator (CQI), a precoding matrix indicator (PMI), or a rank indicator (RI) based on a second set of one or more channel characteristics that are based on the second reference signal.

28. The UE of claim 22, wherein the processor and the memory are further configured to:
receive, via the transceiver, a report configuration message comprising information indicating whether the transmitted report should include one or more of:
a wide beam corresponding to one or more directional beams; or
a narrow beam corresponding to a selected directional beam of the plurality of directional beams.

29. The UE of claim 22, wherein the processor and the memory are further configured to:
determine, based on a moving status of the UE, whether the transmitted report should include one or more of:

a wide beam corresponding to one or more directional beams; or a narrow beam corresponding to a selected directional beam of the plurality of directional beams.

30. The UE of claim 22, wherein the report comprises an indication whether the selected beam is a wide beam corresponding to one or more directional beams, or a narrow beam corresponding to a selected directional beam of the plurality of directional beams.

\* \* \* \* \*